United States Patent [19]

Kayane et al.

[11] Patent Number: 4,977,261
[45] Date of Patent: Dec. 11, 1990

[54] ANTHRAQUINONE COMPOUND

[75] Inventors: Yutaka Kayane, Ibaraki; Takashi Omura, Ashiya; Naoki Harada, Suita; Yasuji Mori; Yosuke Yamamoto, both of Takarazuka; Tetsuya Miyamoto, Takatsuki; Takehiro Kusumoto, Ibaraki, all of Japan

[73] Assignee: Sumitomo Chemical Company, Ltd., Osaka, Japan

[21] Appl. No.: 141,762

[22] Filed: Jan. 11, 1988

[30] Foreign Application Priority Data

| Jan. 14, 1987 | [JP] | Japan | 62-6314 |
| Feb. 16, 1987 | [JP] | Japan | 62-32783 |
| Nov. 30, 1987 | [JP] | Japan | 62-304303 |
| Nov. 30, 1987 | [JP] | Japan | 62-304304 |

[51] Int. Cl.$^5$ ............................................. C07D 251/70
[52] U.S. Cl. ..................................................... 544/199
[58] Field of Search ........................................ 544/189

[56] References Cited

U.S. PATENT DOCUMENTS

| 4,464,297 | 8/1984 | Omura et al. | 260/185 |
| 4,505,714 | 3/1985 | Omura et al. | 8/549 |
| 4,511,507 | 4/1985 | Kayane et al. | 534/629 |
| 4,530,996 | 7/1985 | Omura et al. | 534/642 |
| 4,540,418 | 9/1985 | Otake et al. | 8/524 |
| 4,548,612 | 10/1985 | Kayane et al. | 8/524 |
| 4,551,150 | 11/1985 | Otake et al. | 8/496 |
| 4,607,102 | 8/1986 | Nishikuri et al. | 544/74 |
| 4,618,671 | 10/1986 | Kayane et al. | 534/635 |
| 4,631,341 | 12/1986 | Kayane et al. | 594/189 |
| 4,701,524 | 10/1987 | Kayane et al. | 534/642 |

FOREIGN PATENT DOCUMENTS 40-17113 8/1965 Japan.

OTHER PUBLICATIONS

Chemical Abstracts, vol. 71, (1969), p. 76, Abstract No. 14158k.
Kagaku to Kogyo (Science and Industry), vol. 42, No. 11 (1968) pp. 583-594.

*Primary Examiner*—John M. Ford
*Attorney, Agent, or Firm*—Stevens, Davis, Miller & Mosher

[57] ABSTRACT

A compound of the following formula in the free acid form,

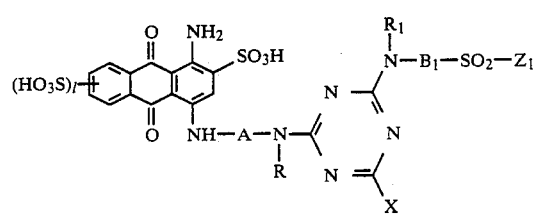

wherein and R and $R_1$ are each hydrogen or alkyl, A is a divalent group of the formula,

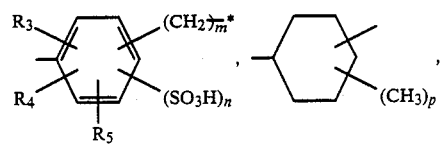

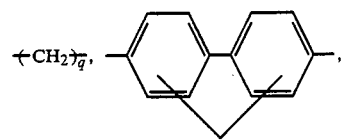

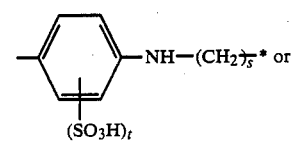

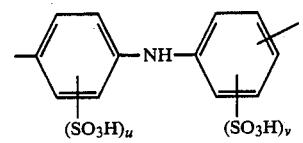

wherein $R_3$, $R_4$ and $R_5$ are each hydrogen, methyl, ethyl, methoxy or ethoxy, m is 0 or 1, n, u and v are each 0, 1 or 2, p is 0, 1, 2 or 3, q and s are each an integer of 2 to 6, and r is 1 or 2, $B_1$ is phenylene or naphthylene, $Z_1$ is vinyl, β-sulfatoethyl or the like, l is 0, 1 or 2, and X is a group of the formula,

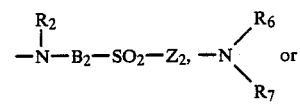

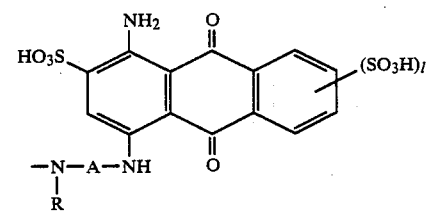

wherein $R_2$ is hydrogen or alkyl, $B_2$ is phenylene or naphthylene, $Z_2$ is vinyl, β-sulfatoethyl or the like, $R_6$ and $R_7$ are each hydrogen, alkyl, phenyl, naphthyl or benzyl, and R, A and l are as defined above, which is useful for dyeing or printing fiber materials to give a dyed or printed product of a brilliant blue color superior in fastness properties such as light fastness and perspiration-light fastness, with superior build-up property.

14 Claims, No Drawings

ANTHRAQUINONE COMPOUND

The present invention relates to an anthraquinone compound, a process for producing the same and a process for dyeing or printing fiber materials using the same.

Reactive dyes, particularly those having a so-called vinylsulfone type fiber reactive group, have been extensively used for dyeing or printing hydroxyl group- or amide group-containing fiber materials, particularly those such as cellulose fibers and polyamide and polyurethane fibers, because of their favorable dye performance.

Fiber reactive anthraquinone dyes of this kind are disclosed in U.S. Pat. No. 4,631,341. Also in Examples 6 and 7 of Published Examined Japanese Patent Application No. 17113/1965, the fiber reactive dyes of the following formula in the free acid form,

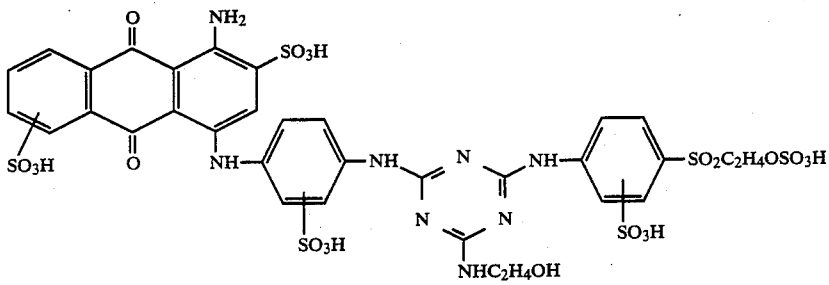

are known.

However, existing fiber reactive dyes become hard to meet needs from technical and economical points of view with recent changes in the situation of dye houses. For example, they become not up to the mark even in the dyeing performance such as build-up and fastness properties which are fundamental requirements for the dyes.

In order to find an anthraquinone compound meeting needs of such high level, the present inventors have undertaken extensive studies on the kind of chromophor, kind and number of fiber reactive groups and kind and linking position of bridging groups between the chromophor and the fiber reactive group, and have found the fact that an anthraquinone compound having a specific combination thereof can meet such needs.

The present invention provides an anthraquinone compound of the following formula (I) in the free acid form,

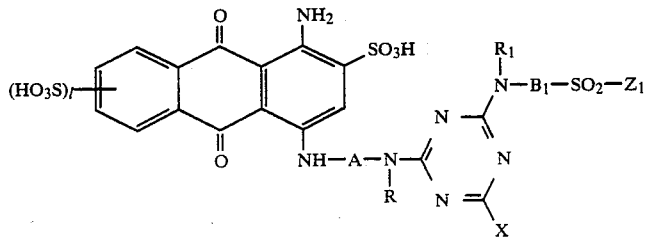

(I)

wherein R and $R_1$ independently of one another are each hydrogen or alkyl, A is a divalent group of the following formula (a), (b), (c), (d), (e) or (f), the formula (a)

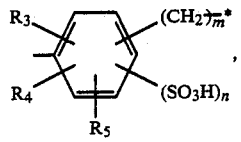

in which $R_3$, $R_4$ and $R_5$ independently of one another are each hydrogen, methyl, ethyl, methoxy or ethoxy, m is 0 or 1, n is 0, 1 or 2, and the asterisked linkage bonds to

the formula (b) being

in which p is 0, 1, 2 or 3, the formula (c) being $-(CH_2)_q-$, in which q is an integer of from 2 through 6, the formula (d) being

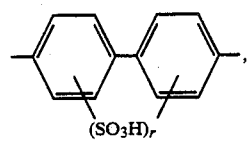

in which r is 1 or 2,
the formula (e) being

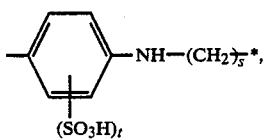

in which s is
an integer of from 2 through 6, t is 0, 1 or 2, and * is as defined above, and the formula (f) being

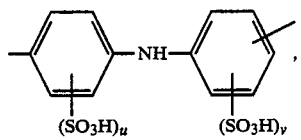

in which u and v independently of one another are each 0, 1 or 2,
$B_1$ is phenylene unsubstituted or substituted once or twice by methyl, ethyl, methoxy, ethoxy, chloro, bromo or nitro, or naphthylene unsubstituted or substituted by sulfo, $Z_1$ is vinyl or —$CH_2CH_2L$ in which L is a group splittable by the action of alkali, l is 0, 1 or 2, and
X is a group of the following formula (g), (h) or (i),
the formula (g) being

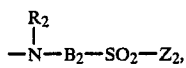

in which $R_2$ is hydrogen or alkyl, $B_2$ is phenylene unsubstituted or substituted once or twice by methyl, ethyl, methoxy, ethoxy, chloro, bromo, nitro, carboxy or sulfo, or naphthylene unsubstituted or substituted by sulfo, and $Z_2$ is vinyl or —$CH_2CH_2L$ in which L is as defined above,
the formula (h) being

in which $R_6$ and $R_7$ independently of one another are each hydrogen, alkyl, phenyl, naphthyl or benzyl, and the formula (i) being

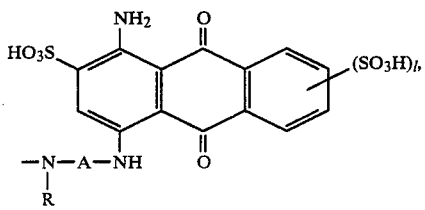

in which R, A and l are
as defined above, and a process for producing the anthraquinone compound of the formula (I), which comprises subjecting any one of an anthraquinone intermediate compound of the following formula (II) in the free acid form,

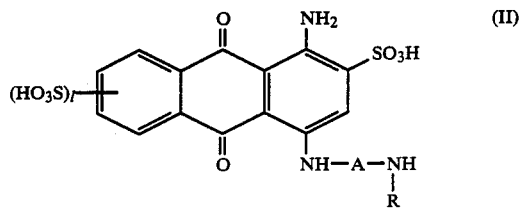

wherein R, A and l are as defined above, an amine compound of the following formula (III),

wherein $R_1$, $B_1$ and $Z_1$ are as defined above, and a compound of the following formula (IV),

wherein X is as defined above, to first condensation with a cyanuric halide, followed by second and third condensation reactions using the remaining two.

The present invention also provides a method for dyeing or printing fiber materials, which comprises using the anthraquinone compound of the formula (I).

In the above formula (I), the alkyl represented by R and $R_1$ is preferably one having 1 to 4 carbon atoms, and is unsubstituted or substituted by hydroxy, cyano, $C_1$-$C_4$ alkoxy, halogeno, carbamoyl, carboxy, $C_1$-$C_4$ alkoxycarbonyl, $C_1$-$C_4$ alkylcarbonyloxy, sulfo or sulfamoyl. Preferred examples thereof are as those disclosed in U.S. Pat. No. 4,631,341. Of these, preferred is a case where R is hydrogen or methyl, and $R_1$ is hydrogen, methyl or ethyl.

Among the divalent groups represented by A, preferred are those having the formula (a) wherein $R_3$, $R_4$ and $R_5$ independently of one another are each hydrogen or methyl, m is 0 or 1, and n is 1, the formula (b) wherein p is 0, 1 or 2, the formula (c) wherein q is 2, 3 or 4, the formula (d) wherein r is 2, the formula (e) wherein s is 2, 3 or 4 and t is 0 or 1, and the formula (f) wherein u and v are independently of one another are each 0 or 1.

Examples of the phenylene and naphthylene represented by $B_1$ are as follows:

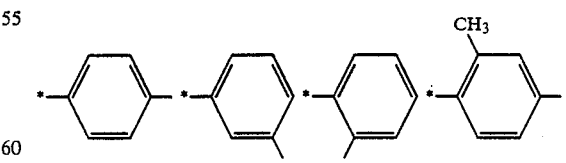

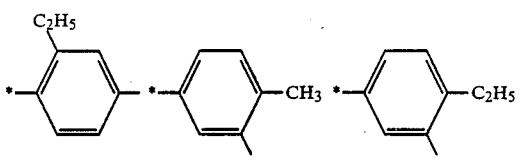

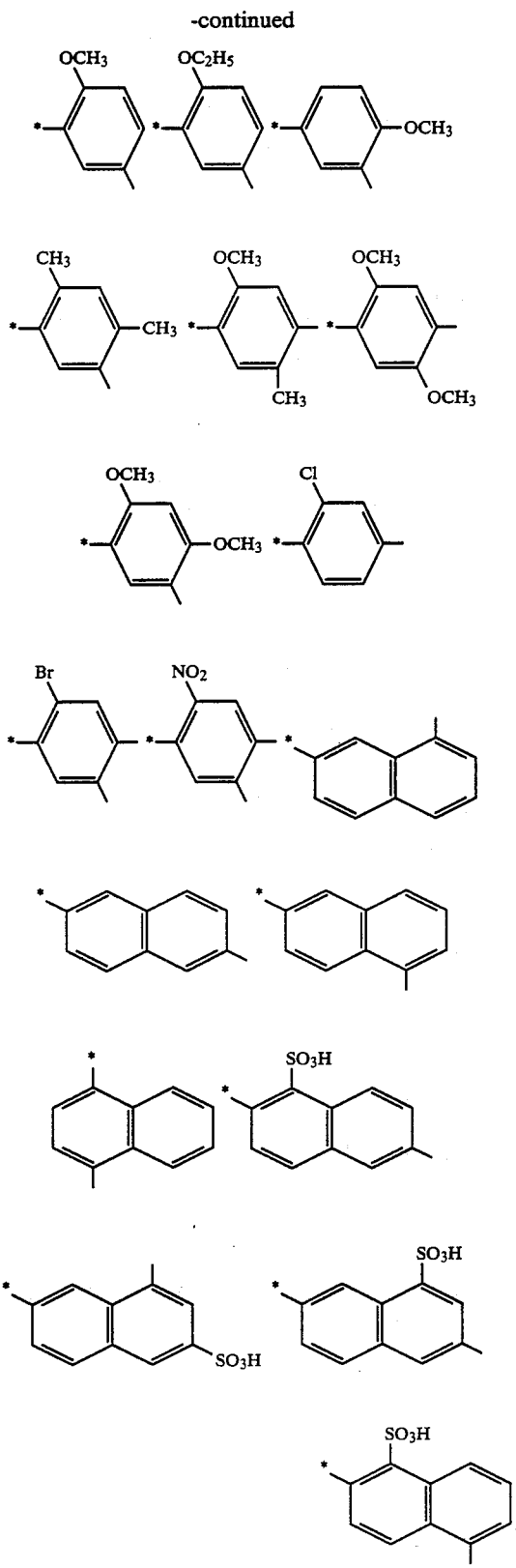

wherein the asterisked linkage bonds to $$-\overset{R_1}{\underset{|}{N}}-.$$

Of these, particularly preferred are phenylene unsubstituted or substituted by methyl or methoxy, and naphthylene unsubstituted or substituted by sulfo.

The number l of sulfo appended to the anthraquinone nucleus can be determined to balance the water solubility of the desired anthraquinone compound (I) in consideration of the numbers of sulfo and other water solubility-imparting groups appended to those other than the anthraquinone nucleus. In the present invention, it is preferred to balance the water solubility by selecting O as the number l.

The splittable group L in $-CH_2CH_2L$ represented by $Z_1$ is known as the one capable of being split by the action of an alkali, and includes, for example, sulfato, thiosulfato, phosphato, acetoxy and chloro. In the present invention, preferred $Z_1$ is β-sulfatoethyl which may be partially replaced by vinyl.

With respect to the group represented by X, the symbols $R_2$, $B_2$ and $Z_2$ in the formula (g) are as explained above for the symbols $R_1$, $B_1$ and $Z_1$, respectively.

The alkyl represented by $R_6$ and $R_7$ in the formula (h) is preferably one having 1 to 4 carbon atoms, and is unsubstituted or substituted once or twice by $C_1$-$C_4$ alkoxy, sulfo, carboxy, hydroxy, chloro, phenyl or sulfato. Of these, preferred are methyl, ethyl, n-propyl, iso-propyl, n-butyl, iso-butyl, sec-butyl, β-sulfatoethyl, β-sulfoethyl, β-methoxyethyl, β-carboxyethyl and the like.

The phenyl represented by $R_6$ and $R_7$ is unsubstituted or substituted once or twice by $C_1$-$C_4$ alkyl, $C_1$-$C_4$ alkoxy, sulfo, carboxy and chloro. Of these, preferred are phenyl, 2-, 3- or 4-sulfophenyl, 2-, 3- or 4-carboxyphenyl, 2-, 3- or 4-chlorophenyl, 2,4-, 2,5- or 3,5-disulfophenyl and the like.

The naphthyl represented by $R_6$ and $R_7$ is unsubstituted or substituted once, twice or three times by hydroxy, carboxy, sulfo, $C_1$-$C_4$ alkyl, $C_1$-$C_4$ alkoxy or chloro. Of these, preferred are 2-, 3-, 4-, 5-, 6-, 7- or 8-sulfo-1-naphthyl, 1-, 5-, 6-, 7- or 8-sulfo-2-naphthyl, 2,4-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo- 1-naphthyl, 1,5,7-, 4,6,8- or 3,6,8-trisulfo-2-naphthyl and the like.

The benzyl represented by R and $R_7$ is unsubstituted or substituted once or twice by $C_1$-$C_4$ alkyl, $C_1$-$C_4$ alkoxy, sulfo or chloro. Of these, preferred are benzyl, 2-, 3- or 4-sulfobenzyl and the like.

Among the groups represented by the formula (h), preferred is a case where any one of $R_6$ and $R_7$ is the unsubstituted or substituted phenyl or naphthyl group, and the other is hydrogen or the alkyl.

Among the anthraquinone compounds of the formula (I), particularly preferred are those of the following formulas (I-1), (I-2) and (I-3), in each free acid form, the formula (I-1) being

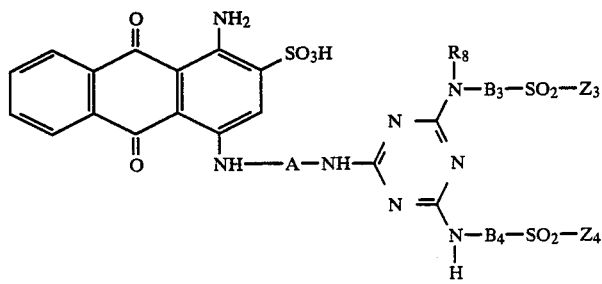

wherein A is as defined above, $R_8$ is hydrogen, methyl or ethyl, $B_3$ and $B_4$ independently of one another are each phenylene unsubstituted or substituted by methyl or methoxy, and $Z_3$ and $Z_4$ independently of one another are each β-sulfatoethyl or vinyl, the formula (I-2) being

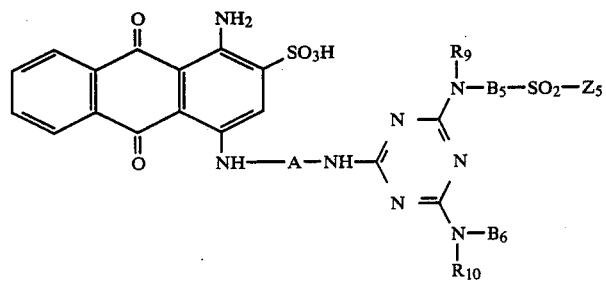

wherein A is as defined above, $R_9$ and $R_{10}$ independently of one another are each hydrogen, methyl or ethyl, $B_5$ is phenylene unsubstituted or substituted by methyl or methoxy, or naphthylene unsubstituted or substituted by sulfo, $B_6$ is phenyl or naphthyl unsubstituted or substituted once or twice by methyl, ethyl, methoxy, ethoxy, sulfo, carboxy or chloro, and $Z_5$ is β-sulfatoethyl or vinyl, and the formula (I-3) being

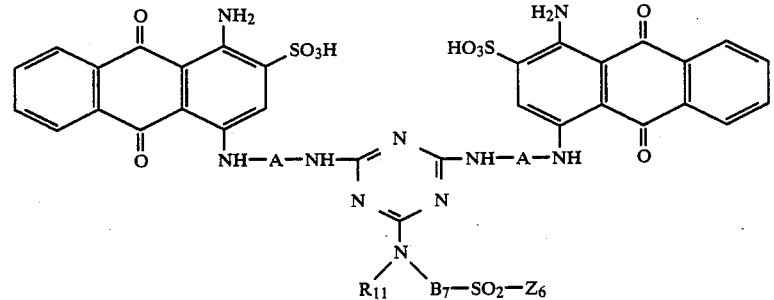

wherein A is as defined above, $R_{11}$ is hydrogen, methyl or ethyl, $B_7$ is phenylene unsubstituted or substituted by methyl or methoxy, or naphthylene unsubstituted or substituted by sulfo, and $Z_6$ is β-sulfatoethyl or vinyl.

The anthraquinone compounds of the present invention may be in the form of a free acid or an alkali metal or alkaline earth metal salt, preferably such as sodium or potassium salt.

The present anthraquinone compound of the formula (I) can be produced, for example, in the following manner.

Any one of the anthraquinone intermediate compound of the formula (II), the amine compound of the formula (III) and the compound of the formula (IV) is subjected to first condensation with a cyanuric halide such as cyanuric chloride, cyanuric fluoride and the like, followed by second and third condensations using the remaining ones.

The first condensation can be carried out in an aqueous medium at a temperature of −5° to 30° C., while controlling the pH within a range of 2 to 8, the second condensation at a temperature of 10° to 50° C., while controlling the pH within a range of 3 to 9, and the third condensation at a temperature of 30° to 90° C., while controlling the pH within a range of 2 to 6.

The anthraquinone intermediate compound of the formula (II) can be readily obtained in a conventional manner, for example, by subjecting a 1-amino-4-bromoanthraquinonesulfonic acid of the following formula (V),

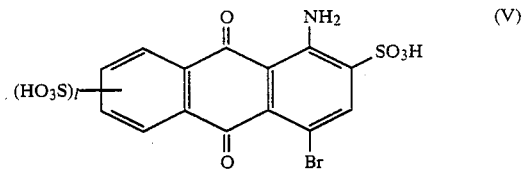

wherein l is as defined above, and a diamine compound of the following formula (VI),

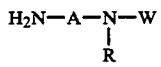
(VI)

wherein A and R are as defined above, and W is an amino-protecting group such as acetyl, or hydrogen, to Ullmann condensation reaction, followed by hydrolysis using an alkali or acid, if the diamine compound having the amino-protecting group as W is used.

In the above process for the production of the anthraquinone compound (I), the starting compounds may be used in the form of a free acid or an alkali metal or alkaline earth metal salt, depending on the reaction conditions.

Examples of the anthraquinonesulfonic acid (V) are 1-amino-4-bromoanthraquinone-2-sulfonic acid, 1-amino-4-bromoanthraquinone-2,6- or 2,7-disulfonic acid and 1-amino-4-bromoanthraquinone-2,5,8-trisulfonic acid.

Examples of the diamine compound (VI) are 2,4,6-trimethyl-3,5-diaminobenzenesulfonic acid, 5-methyl-2,4-diaminobenzenesulfonic acid, 2,4-diaminobenzene-1,5-disulfonic acid, 2,5-diaminobenzene-1,4-disulfonic acid, 2,5-diamino-4-methoxybenzenesulfonic acid, 1,3- or 1,4-diaminocyclohexane, 2- or 4-methyl-1,3-diaminocyclohexane, 5,5-dimethyl-1,3-diaminocyclohexane, 1-amino-4-N-methyl, ethyl or β-carboxyethylaminocyclohexane, 4-aminomethyl-2-amino-5-methylbenzenesulfonic acid, 4- or 5-aminomethyl-2-aminobenzenesulfonic acid, 5-aminomethyl-3-amino-2,4-dimethylbenzenesulfonic acid, 6-aminomethyl-2-amino-3-methoxybenzenesulfonic acid, 3-aminomethyl-2-amino-5-methylbenzenesulfonic acid, 4-aminomethyl-2-amino-5-methoxybenzenesulfonic acid, 5-aminomethyl-2-aminobenzene-1,4-disulfonic acid, 4-aminomethyl-2-amino-5-ethylbenzenesulfonic acid, N-methyl or N-ethyl compounds of the above aminomethyl-carrying compounds, ethylenediamine, 1,3-diaminopropane, 1,4-diaminobutane, 1,6-diaminohexane, 4,4'-diaminobiphenyl-2,2'-disulfonic acid, 4,4'-diaminobiphenyl-3-sulfonic acid, m- or p-phenylenediamine, 2,4- or 2,5-diaminobenzenesulfonic acid, N-β-carboxyethyl-p-phenylenediamine, 4-(β-aminoethyl)aniline, 4-(γ-aminopropylamino)aniline, 4-(β-aminoethylamino)aniline-2-sulfonic acid, 4-(β-aminoethylamino)aniline-3-sulfonic acid, 4-(β-aminoethylamino)aniline-2,5-disulfonic acid, 4-(γ-aminopropylamino)aniline-2-sulfonic acid, 4-(γ-aminopropylamino)aniline-2,5-disulfonic acid, 4-(4'-aminobutylamino)aniline-3-sulfonic acid, 4-(5'-aminoamylamino)aniline-3-sulfonic acid, 4-(6'-aminohexylamino)aniline-3-sulfonic acid, 4-(3'-aminophenylamino)aniline, 4-(4'-aminophenylamino)aniline, 4-(3'-aminophenylamino)aniline-2-sulfonic acid, 4-(3'-aminophenylamino)aniline-3-sulfonic acid, 4-(4'-amino-phenylamino)aniline-2-sulfonic acid, 4-(4'-aminophenylamino)aniline-3-sulfonic acid, 4-[(3'-amino-4'-sulfo)phenylamino]aniline, 4-[(4'-amino-3'-sulfo)phenylamino]aniline, 4-[(3'-amino-4'-sulfo)phenylamino]aniline-2-sulfonic acid, 4-[(3'-amino-4'-sulfo)phenylamino]aniline-3-sulfonic acid, 4-[(4'-amino-3'-sulfo)phenylamino]aniline-2-sulfonic acid, 4-[(4'-amino-3'-sulfo)phenylamino]aniline-3-sulfonic acid, 4-[(4'-amino-2',5'-disulfo)phenylamino]aniline-3-sulfonic acid and compounds, one amino of which has been protected by acetyl or the like.

The compound (IV) having the formula (h) as X includes aromatic and aliphatic amine compounds.

Examples of the aromatic amine compounds are 1-aminobenzene, 1-amino-2-, 3- or 4-methylbenzene, 1-amino-2, 3 or 4-ethylbenzene, 1-amino-2-, 3- or 4-methoxybenzene, 1-amino-2-, 3- or 4-ethoxybenzene, 1-amino-2-, 3- or 4-chlorobenzene, 1-amino-2,4- or 2,5-dimethylbenzene, 1-amino-3,4- or 3,5-dimethylbenzene, 1-amino-2,4- or 2,5-dichlorobenzene, N-methyl or N-ethyl compounds thereof, 2-, 3- or 4-aminobenzenesulfonic acid, 5-aminobenzene-1,3-disulfonic acid, 6-aminobenzene-1,4-disulfonic acid, 6-aminobenzene-1,3-disulfonic acid, 4-amino-5-methylbenzene-1,3-disulfonic acid, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-(2-hydroxyethyl)amino-3-methylbenzene, 3- or 4-methylaminobenzoic acid, 3- or 4-methylaminobenzenesulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 4-aminonaphthalene-2-sulfonic acid, 5-aminonaphthalene-2-sulfonic acid, 6-aminonaphthalene-2-sulfonic acid, 7-aminonaphthalene-2-sulfonic acid, 7-methylaminonaphthalene-2-sulfonic acid, 7-ethylaminonaphthalene-2-sulfonic acid, 7-butylaminonaphthalene-2-sulfonic acid, 7-isobutylaminonaphthalene-2-sulfonic acid, 8-aminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid and 4-aminonaphthalene-1,3,7-trisulfonic acid.

Examples of the aliphatic amine compounds are methylamine, ethylamine, n-propylamine, isopropylamine, n-butylamine, isobutylamine, sec-butylamine, dimethylamine, diethylamine, methylethylamine, 2-chloroethylamine, 2-methoxyethylamine, 2-aminoethanol, 2-methylaminoethanol, bis-(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, e-aminocaproic acid, benzylamine, 2-, 3- or 4-chlorobenzylamine, 4-methylbenzylamine, N-methylbenzylamine, 2-, 3- or 4-sulfobenzylamine, 2-phenylethylamine, 1-phenylethylamine, and 1-phenyl-2-propylamine.

After completion of the reaction, the desired anthraquinone compound-containing reaction mixture may be formed into a liquid commercial product, if desired, after removing inorganic salts and with addition of a stabilizer or a dyeing improver. The liquid product obtained or the aforesaid reaction mixture may be subjected to evaporation such as spray-drying, thereby obtaining a pulverulent commercial product. Alternatively according to a conventional manner, the reaction mixture may be formed into either a liquid or pulverulent commercial product through salting-out using an electrolyte.

The anthraquinone compound (I) of the present invention is fiber-reactive and useful for dyeing or printing fiber materials such as hydroxyl group-containing and amide group-containing fiber materials.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fiber such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing can be carried out in a manner suitable for the fiber reactive group of the compound.

For example, the dyeing of cellulose fiber materials can be carried out using the anthraquinone compound of the present invention and an acid binding agent such as sodium hydroxide, sodium carbonate, phosphates, silicates, sodium hydrogencarbonate and the like. The dyeing method can be determined depending on the nature and physical shape of the fibers to be dyed, and selected from, for example, exhaustion dyeing method, printing method, cold-pad-batch-up method and the like.

The exhaustion dyeing can be carried out at a relatively low temperature in the presence of an acid binding agent such as sodium carbonate, trisodium phosphate, sodium hydroxide and the like together with a neutral salt such as sodium sulfate, sodium chloride and the like. In carrying out the printing, a printing paste can be prepared using a paste or emulsion paste such as sodium alginate and starch ether, and an alkali compound such as sodium carbonate, sodium hydrogencarbonate, sodium hydroxide, trisodium phosphate, sodium trichloroacetate and their potassium or alkaline earth metal compounds or an alkali-liberating compound, if desired, together with conventional printing auxiliaries such as urea or a dispersant. Fibers can be printed with the printing paste, dried and then heat-treated particularly in the presence of steam, thereby completing the printing. In carrying out the cold-pad-batch-up method, a padding liquor can be prepared using sodium hydroxide alone or a mixture thereof with sodium silicate, sodium carbonate or trisodium phosphate as the acid binding agent, if desired, together with sodium sulfate or sodium chloride, and a hydrotropic agent such as urea or a penetrant. The fibers can be padded at ambient temperature with the padding liquor, batched-up on a roller, allowed to stand for 3 hours or more or overnight, thereafter washed with water and then dried to complete the dyeing.

The anthraquinone compound in accordance with the present invention can be characterized by superior dye performance in the dyeing and printing of fiber materials, particularly those such as cellulose fibers. The anthraquinone compound can exhibit high exhaustion and fixation percentages, and superior build-up, level-dyeing and washing-off properties as well as high robustness so that the dyeability can hardly affected by some changes in dyeing conditions such as temperatures, bath ratios, salt concentration and the like. Moreover, dyed or printed products are superior in fastness properties such as light fastness, perspiration-light fastness, perspiration fastness, acid-hydrolysis fastness, washing fastness, chlorine fastness and the like.

The present invention is illustrated in more detail with reference to the following examples, which are only illustrative and not intended to limit the scope of the present invention. In examples, parts are by weight.

EXAMPLE 1

1-Amino-4-(3'-amino-2',4',6'-trimethyl-5'-sulfoanilino)anthraquinone-2-sulfonic acid (23.7 parts), cyanuric chloride (9.3 parts) and 1-aminobenzene-4-$\beta$-sulfatoethylsulfone (14.1 parts) were subjected to condensation in an aqueous medium one after another in a usual manner. Successively, the condensate was allowed to react with 1-aminobenzene-3-$\beta$-sulfatoethylsulfone (14.1 parts) at 60° to 70° C. under a weak acid condition. Thereafter, the reaction mixture was salted-out to separate crystals, thereby obtaining an anthraquinone compound of the following formula in the free acid form.

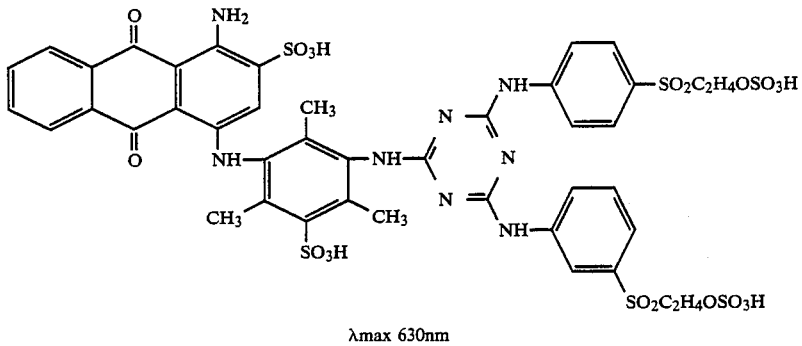

λmax 630nm

EXAMPLE 2

Example 1 was repeated, provided that 1-amino-4-(3'-amino-2',4',6'-trimethyl-5'-sulfoanilino)anthraquinone-2-sulfonic acid, 1-aminobenzene-4-$\beta$-sulfatoethylsulfone and 1-aminobenzene-3-$\beta$-sulfatoethylsulfone were replaced by the respective compounds shown in Columns 1, 2 and 3 of the following table, respectively, thereby obtaining the corresponding anthraquinone compounds of a shade on cellulose fibers as shown in Column 4.

These compounds show the aforementioned beneficial properties of the present invention.

| Run No. | Column 1 | Column 2 | Column 3 | Column 4 |
|---|---|---|---|---|
| 1 | 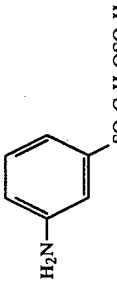 | 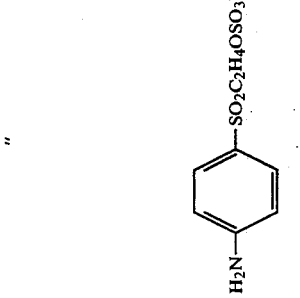 | 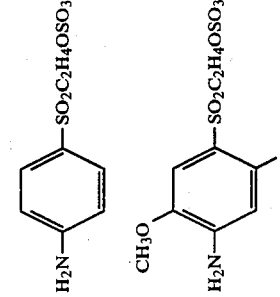 | Brilliant blue |
| 2 | " |  | | " |
| 3 | " | 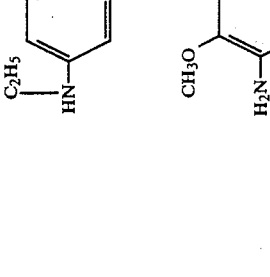 | 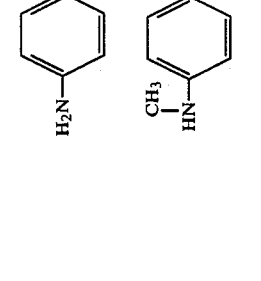 | " |
| 4 | " |  |  | " |
| 5 |  |  |  | Brilliant blue |

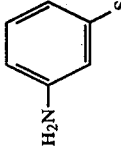

-continued

| Run No. | Column 1 | Column 2 | Column 3 | Column 4 |
|---|---|---|---|---|
| 11 | 1,4-diamino-2-sulfo-anthraquinone with 3-aminophenylamino substituent | 3-aminophenyl-SO$_2$C$_2$H$_4$OSO$_3$H | 4-aminophenyl-SO$_2$C$_2$H$_4$OSO$_3$H | " |
| 12 | " | 3-amino-5-ethylphenyl-SO$_2$C$_2$H$_4$OSO$_3$H | 3-aminophenyl-SO$_2$CH=CH$_2$ | " |
| 13 | anthraquinone derivative with NH$_2$, SO$_3$H, and (2-amino-4-sulfo-5-methylphenyl)amino, with CH$_3$ | 4-amino-3-methylphenyl-SO$_2$C$_2$H$_4$OSO$_3$H | 3-aminophenyl-SO$_2$C$_2$H$_4$OSO$_3$H | Brilliant blue |
| 14 | anthraquinone derivative with NH$_2$, SO$_3$H, SO$_3$H, CH$_3$, CH$_2$NH$_2$ substituents | 3-aminophenyl-SO$_2$C$_2$H$_4$OSO$_3$H | | " |

-continued

| Run No. | Column 1 | Column 2 | Column 3 | Column 4 |
|---|---|---|---|---|
| 15 | anthraquinone with NH₂, SO₃H, SO₃H, NH, and phenyl with CH₂NH₂ substituents | H₂N–C₆H₄–SO₂C₂H₄OSO₃H | " | " |
| 16 | anthraquinone with NH₂, SO₃H, SO₃H, NH, and phenyl with CH₂NH₂ substituents | H₂N–C₆H₄–SO₂CH=CH₂ | CH₃O, H₂N substituted phenyl with SO₂C₂H₄OSO₃H and OCH₃ | Brilliant blue |
| 17 | anthraquinone with NH₂, SO₃H, NH, and trimethyl phenyl with CH₂NH₂, SO₃H, CH₃, CH₃ substituents | OCH₃, H₂N substituted phenyl with SO₂C₂H₄OSO₃H | H₂N–C₆H₄–SO₂C₂H₄OPO₃H₂ | " |

-continued

| Run No. | Column 1 | Column 2 | Column 3 | Column 4 |
|---|---|---|---|---|
| 18 | 1-amino-4-[(2-methoxy-6-aminomethyl-3-sulfo)phenylamino]-2-sulfoanthraquinone | 4-amino-2-methoxyphenyl-SO$_2$C$_2$H$_4$OSO$_3$H | 6-amino-2-naphthyl-SO$_2$C$_2$H$_4$OSO$_3$H | " |
| 19 | 1-amino-4-[(2-aminomethyl-4-methyl-6-sulfo)phenylamino]-2-sulfoanthraquinone | 4-aminophenyl-SO$_2$C$_2$H$_4$OSO$_3$H | 3-aminophenyl-SO$_2$C$_2$H$_4$OSO$_3$H | Brilliant blue |
| 20 | 1-amino-4-[(2-aminomethyl-4-methoxy-5-sulfo)phenylamino]-2-sulfoanthraquinone | 4-amino-2,5-dimethoxyphenyl-SO$_2$C$_2$H$_4$OSO$_3$H | | " |

-continued

| Run No. | Column 1 | Column 2 | Column 3 | Column 4 |
|---|---|---|---|---|
| 21 | 1-amino-4-[(4-aminomethyl-2,5-disulfo)phenylamino]-2-sulfoanthraquinone | 4-aminophenyl-SO₂CH=CH₂ | " | Brilliant blue |
| 22 | 1-amino-4-[(4-aminomethyl-5-ethyl-2-sulfo)phenylamino]-2-sulfoanthraquinone | 4-aminophenyl-SO₂C₂H₄OCOCH₃ | 3-amino-4-bromophenyl-SO₂C₂H₄OSO₃H | " |
| 23 | 1-amino-4-[(4-aminomethyl(methyl)-2-sulfo)phenylamino]-2-sulfoanthraquinone | 3-amino-4-ethoxyphenyl-SO₂C₂H₄OSO₃H | 3-aminophenyl-SO₂C₂H₄OSO₃H | " |
| 24 | 1-amino-4-[(4-aminomethyl(methyl)-2-sulfo)phenylamino]-2-sulfoanthraquinone | " | " | " |

(Structural formulas shown in original; see chemical descriptions above for Column 1 anthraquinone derivatives and Column 2/3 aromatic amines.)

-continued

| Run No. | Column 1 | Column 2 | Column 3 | Column 4 |
|---|---|---|---|---|
| 25 | 1-amino-4-[(benzyl-ethylamino)-phenyl-amino]-anthraquinone-2,2'-disulfonic acid derivative | 4-methyl-3-(β-sulfatoethylsulfonyl)aniline | 4-(β-sulfatoethylsulfonyl)aniline | Brilliant blue |
| 26 | anthraquinone derivative with CH₂NH₂ substituent | 3-(β-sulfatoethylsulfonyl)aniline | " | " |
| 27 | anthraquinone derivative with CH₂NH-CH₃ | 6-amino-2-(β-sulfatoethylsulfonyl)naphthalene | 3-(β-sulfatoethylsulfonyl)aniline | " |
| 28 | anthraquinone derivative with CH₂NH₂ | 3-(N-(2-hydroxyethyl)amino)-(β-sulfatoethylsulfonyl)benzene | 3-(β-sulfatoethylsulfonyl)aniline | Brilliant blue |

-continued

| Run No. | Column 1 | Column 2 | Column 3 | Column 4 |
|---|---|---|---|---|
| 29 | anthraquinone with NH2, SO3H, NH-aryl(CH2NH2, SO3H) | C2H4CONH2-NH-C6H4-SO2C2H4OSO3H | " | " |
| 30 | anthraquinone with NH2, SO3H, NH-aryl(CH2NH2, CH3, SO3H) | C2H4COOH-NH-C6H4-SO2C2H4OSO3H | " | " |
| 31 | anthraquinone with NH2, SO3H, NH-aryl(CH2NH2, CH3, SO3H) | C3H7-n-NH-C6H4-SO2C2H4OSO3H | H2N-C6H4-SO2C2H4OSO3H (meta) | Brilliant blue |
| 32 | anthraquinone with NH2, SO3H, NH-cyclohexyl-NH2 | H2N-C6H4-SO2C2H4OSO3H (meta) | H2N-C6H4-SO2C2H4OSO3H (para) | " |

-continued

| Run No. | Column 1 | Column 2 | Column 3 | Column 4 |
|---|---|---|---|---|
| 33 | " | " | | " |
| 34 | | 4-amino-2-(SO$_2$C$_2$H$_4$OSO$_3$H)-anisole | | " |
| 35 | 1-amino-4-(4-aminocyclohexylamino)-2-sulfoanthraquinone | 4-(N-ethylamino)phenyl-SO$_2$C$_2$H$_4$OSO$_3$H | 3-aminophenyl-SO$_2$C$_2$H$_4$OSO$_3$H | Brilliant blue |
| 36 | 1-amino-4-(3-aminocyclohexylamino)-2-sulfoanthraquinone | 3-aminophenyl-SO$_2$C$_2$H$_4$OSO$_3$H | 3-aminophenyl-SO$_2$C$_2$H$_4$OSO$_3$H | " |
| 37 | 1-amino-4-(4-aminocyclohexylamino)-2-sulfo-6-sulfoanthraquinone | 3-aminophenyl-SO$_2$C$_2$H$_4$OSO$_3$H | 3-aminophenyl-SO$_2$C$_2$H$_4$OSO$_3$H | " |

-continued

| Run No. | Column 1 | Column 2 | Column 3 | Column 4 |
|---|---|---|---|---|
| 38 | (anthraquinone with NH₂, SO₃H, and NH-cyclohexyl-NH₂ substituents) | 4-H₂N-C₆H₄-SO₂C₂H₄SSO₃H | " | " |
| 39 | (anthraquinone with NH₂, SO₃H, NH-cyclohexyl-NH₂, and HO₃S substituents) | 4-H₂N-3-CH₃-C₆H₃-SO₂C₂H₄OSO₃H | 3-H₂N-C₆H₄-SO₂C₂H₄OSO₃H | Brilliant blue |
| 40 | (anthraquinone with NH₂, SO₃H, NH-cyclohexyl-NH₂, and HO₃S substituents) | 3-H₂N-C₆H₄-SO₂C₂H₄Cl | 2-H₂N-C₆H₄-SO₂C₂H₄OSO₃H | " |
| 41 | (anthraquinone with NH₂, SO₃H, NH-cyclohexyl-NH₂, and two HO₃S substituents) | 4-H₂N-C₆H₄-SO₂CH=CH₂ | 1-(SO₂C₂H₄OSO₃H)-6-H₂N-naphthyl | " |

| Run No. | Column 1 | Column 2 | Column 3 | Column 4 |
|---|---|---|---|---|
| 42 | 1-amino-4-(2-methyl-3-aminocyclohexylamino)-2-sulfoanthraquinone | 4-aminophenyl-SO₂C₂H₄OSO₃H | 1-amino-6-sulfo-2-(β-sulfatoethylsulfonyl)naphthalene | " |
| 43 | 1-amino-4-(3-amino-4-methylcyclohexylamino)-2-sulfoanthraquinone | 3-aminophenyl-SO₂C₂H₄OSO₃H | 4-aminophenyl-SO₂C₂H₄OSO₃H | Brilliant blue |
| 44 | 1-amino-4-(3-amino-5,5-dimethylcyclohexylamino)-2-sulfoanthraquinone | 4-aminophenyl-SO₂C₂H₄OSO₃H | 3-aminophenyl-SO₂C₂H₄OSO₃H | " |
| 45 | 1-amino-4-(4-methylaminocyclohexylamino)-2-sulfoanthraquinone | 4-amino-3-chlorophenyl-SO₂C₂H₄OSO₃H | " | " |

-continued

| Run No. | Column 1 | Column 2 | Column 3 | Column 4 |
|---|---|---|---|---|
| 46 | 1,4-diamino-2-sulfo-anthraquinone with 4-(ethylamino)cyclohexylamine substituent | 4-aminophenyl-SO₂C₂H₄OSO₃H | | |
| 47 | 1,4-diamino-2-sulfo-anthraquinone with 4-(N-C₂H₄COOH-amino)cyclohexylamine substituent | 6-amino-2-naphthyl-SO₂C₂H₄OSO₃H | 3-aminophenyl-SO₂C₂H₄OSO₃H | Brilliant blue |
| 48 | 1,4-diamino-2-sulfo-anthraquinone with 4-aminocyclohexylamine substituent | 3-(N-C₂H₅-amino)phenyl-SO₂C₂H₄OSO₃H | 4-aminophenyl-SO₂C₂H₄OSO₃H | " |
| 49 | " | 3-(N-C₂H₄COOH-amino)phenyl-SO₂CH=CH₂ | " | " |
| 50 | " | 3-(N-C₃H₇-amino)phenyl-SO₂C₂H₄OSO₃H | " | " |

-continued

| Run No. | Column 1 | Column 2 | Column 3 | Column 4 |
|---|---|---|---|---|
| 51 | 1-amino-4-[(3-aminocyclohexyl)amino]-2-sulfoanthraquinone | 3-(C₂H₄CONH₂)(HN-)-benzene with SO₂C₂H₄OSO₃H | 4-aminophenyl-SO₂C₂H₄OSO₃H | Brilliant blue |
| 52 | " | 2-(C₂H₄OH)(HN-)-benzene with SO₂C₂H₄OSO₃H | " | " |
| 53 | 1-amino-4-[(3-aminocyclohexyl)amino]-2-sulfo-6-sulfoanthraquinone | 4-(CH₃)(HN-)-phenyl-SO₂CH=CH₂ | 2,5-dimethoxy-4-aminophenyl-SO₂C₂H₄OSO₃H | " |
| 54 | 1-amino-4-[(3-aminocyclohexyl)amino]-2-sulfoanthraquinone | 4-(C₂H₅)(HN-)-2-OCH₃-phenyl-SO₂C₂H₄OSO₃H | 3-aminophenyl-SO₂C₂H₄OSO₃H | " |

-continued

| Run No. | Column 1 | Column 2 | Column 3 | Column 4 |
|---|---|---|---|---|
| 55 | anthraquinone derivative with NH₂, SO₃H, NH-cyclohexyl-NH₂ substituents | 4-(ethylamino)phenyl-SO₂C₂H₄OSO₃H | 3-aminophenyl-SO₂C₂H₄OSO₃H | Brilliant blue |

EXAMPLE 3

1-Amino-4-(3'-aminopropylamino)anthraquinone-2-sulfonic acid (20 parts), cyanuric chloride (9.2 parts) and 1-aminobenzene-4-β-sulfatoethylsulfone (14.1 parts) were subjected to condensation in an aqueous medium one after another in a usual manner. Successively, the resulting condensate was further allowed to react with 1-aminobenzene-3-β-sulfatoethylsulfone (14.1 parts) at 60° to 70° C. under a weak acid condition. Thereafter, the reaction mixture was salted-out to separate crystals, thereby obtaining an anthraquinone compound of the following formula in the free acid form.

EXAMPLE 4

Example 3 was repeated, provided that 1-amino-4-(3'-aminopropylamino)anthraquinone-2-sulfonic acid, 1-aminobenzene-4-β-sulfatoethylsulfone and 1-aminobenzene-3-β-sulfatoethylsulfone were replaced by the respective compounds shown in Columns 1, 2 and 3 of the following table, respectively, thereby obtaining the corresponding anthraquinone compound of a shade on cellulose fibers as shown in Column 4.

These compounds show the aforementioned beneficial properties of the present invention.

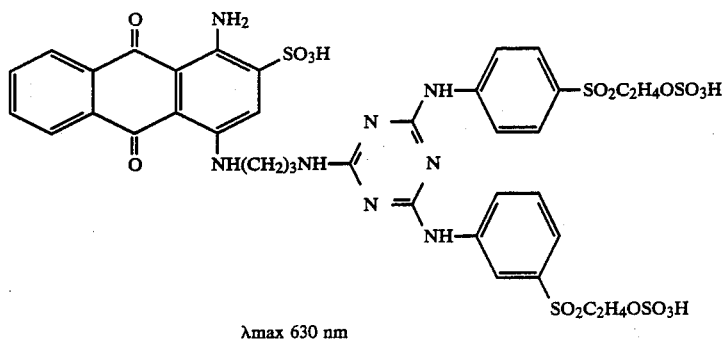

λmax 630 nm

| Run No. | Column 1 | Column 2 | Column 3 | Column 4 |
|---|---|---|---|---|
| 1 | 1-amino-4-(6-aminohexylamino)anthraquinone-2-sulfonic acid | H₂N—C₆H₄—SO₂C₂H₄OSO₃H | H₂N—C₆H₄(SO₂C₂H₄OSO₃H) (meta) | Brilliant blue |
| 2 | 1-amino-4-(3-aminopropylamino)-7-sulfoanthraquinone-2-sulfonic acid | H₂N—C₆H₄(SO₂C₂H₄OSO₃H) (meta) | C₂H₅-HN—C₆H₄—SO₂C₂H₄OSO₃H | Brilliant blue |
| 3 | 1-amino-4-(2-aminoethylamino)anthraquinone-2-sulfonic acid | H₂N—C₆H₄—SO₂C₂H₄OSO₃H | aminonaphthalene with HO₃S and SO₂C₂H₄OSO₃H | Brilliant blue |
| 4 | 1-amino-4-(2-aminoethylamino)-6-sulfoanthraquinone-2-sulfonic acid | H₂N—C₆H₄—SO₂C₂H₄Cl | 2,5-dimethoxy aniline with SO₂C₂H₄OSO₃H | Brilliant blue |
| 5 | 1-amino-4-(4-aminobutylamino)-5,8-disulfoanthraquinone-2-sulfonic acid | H₂N—C₆H₄—SO₂CH=CH₂ | aminonaphthalene with SO₂C₂H₄OSO₃H | Brilliant blue |
| 6 | 1-amino-4-(5-aminopentylamino)-7-sulfoanthraquinone-2-sulfonic acid | CH₃-HN—C₆H₄—SO₂CH=CH₂ | H₂N—C₆H₄(SO₂C₂H₄OSO₃H) (meta) | Brilliant blue |

| Run No. | Column 1 | Column 2 | Column 3 | Column 4 |
|---|---|---|---|---|
| 7 | (anthraquinone with NH₂, SO₃H, SO₃H, NH-biphenyl-NH₂, SO₃H) | H₂N–⟨⟩–SO₂C₂H₄OSO₃H | H₂N–⟨⟩–SO₂C₂H₄OSO₃H | Brilliant blue |
| 8 | (anthraquinone with NH₂, SO₃H, NH-biphenyl(SO₃H)-NH₂) | H₂N–⟨⟩–SO₂C₂H₄OSO₃H | " | Brilliant blue |
| 9 | (HO₃S-anthraquinone with NH₂, SO₃H, NH-biphenyl(SO₃H)-NH₂) | H₂N–⟨⟩(CH₃)–SO₂C₂H₄Cl | H₂N–⟨⟩–SO₂C₂H₄OSO₃H | Brilliant blue |
| 10 | (HO₃S-anthraquinone with NH₂, SO₃H, NH-biphenyl(SO₃H)-NH₂) | Cl–⟨⟩(H₂N)–SO₂C₂H₄OSO₃H | H₂N–⟨⟩–SO₂C₂H₄OSO₃H | Brilliant blue |
| 11 | (HO₃S-anthraquinone with NH₂, SO₃H, SO₃H, NH-biphenyl(SO₃H)-NH₂) | H₂N–⟨⟩–SO₂C₂H₄OSO₃H | " | Brilliant blue |

DYEING EXAMPLE 1

The anthraquinone compound obtained in Example 1 (each 0.1, 0.3 and 0.6 part) was dissolved in water (200 parts), and then sodium sulfate (20 parts) and cotton (10 parts) were added thereto. The bath was heated to 60° C., and 30 minutes thereafter, sodium carbonate (3 parts) was added thereto. Dyeing was continued for 1 hour at that temperature. Thereafter, the cotton taken out was washed with water and soaped to obtain each dyed product of a brilliant blue color superior in fastness properties, particularly light fastness and perspiration-light fastness with excellent build-up property.

The compound was also found to have superior solubility, level-dyeing property and reproducibility of the dyeing.

DYEING EXAMPLE 2

The anthraquinone compound obtained in Run No. 7 of Example 2 (0.3 part) was dissolved in water (200 parts), and sodium sulfate (20 parts) and cotton (10 parts) were added thereto. The bath was heated to 60° C., and 20 minutes thereafter, trisodium phosphate (3 parts) was added thereto. Dyeing was continued for 1 hour at that temperature. Thereafter, the cotton taken out was washed with water and soaped to obtain a dyed product of a brilliant blue color superior in fastness properties.

DYEING EXAMPLE 3

| Composition of printing paste | Parts |
|---|---|
| Anthraquinone compound obtained in Example 3 | 5 |
| Urea | 5 |
| Sodium alginate (5%), thickner | 50 |
| Hot water | 25 |
| Sodium hydrogencarbonate | 2 |
| Balance (water) | 13 |

Mercerized cotton broad cloth was printed with the printing paste of the above composition, pre-dried, steamed at 100° C. for 5 minutes, washed with hot water, soaped, again washed with hot water and dried, to obtain a printed product of a brilliant blue color superior in fastness properties.

EXAMPLE 5

1-Amino-4-bromoanthraquinone-2-sulfonic acid and 4-[(4'-amino-3'-sulfo)phenylamino]aniline-3-sulfonic acid was subjected to Ullmann condensation in the presence of cuprous chloride as a catalyst, thereby obtaining an anthraquinone intermediate compound of the following formula (1) in the free acid form.

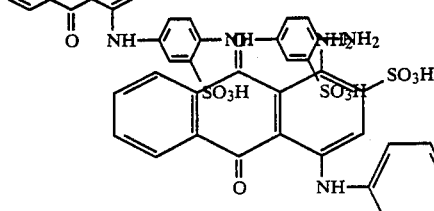
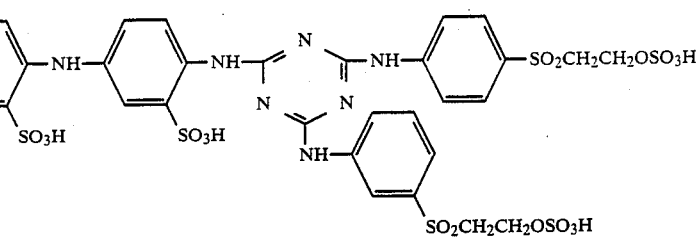

(1)

(λmax 640 nm)

(14.1 parts) at 60° to 70° C. under a weak acid condition. The reaction mixture was salted-out to separate crystals, thereby obtaining an anthraquinone compound of the following formula in the free acid form.

The above intermediate compound (33 parts) was subjected to first condensation in an aqueous medium with cyanuric chloride (9.3 parts) in a usual manner, followed by second condensation with 1-aminobenzene-4-β-sulfatoethylsulfone (14.1 parts). Successively, the resulting condensate was subjected to third condensation with 1-aminobenzene-3-β-sulfatoethylsulfone

EXAMPLE 6

Example 5 was repeated, provided that the intermediate compound of the formula (1), 1-aminobenzene-4-β-sulfatoethylsulfone and 1-aminobenzene-3-β-sulfatoethylsulfone were replaced by the respective compounds shown in Columns 1, 2 and 3 of the following table, thereby obtaining the corresponding anthraquinone compound of a shade on cellulose fibers as shown in Column 4.

These compounds show the aforementioned beneficial properties of the present invention.

| Run No. | Column 1 | Column 2 | Column 3 | Column 4 |
|---|---|---|---|---|
| 1 | Anthraquinone core: 1-NH$_2$, 2-SO$_3$H, 4-NH-[phenyl(3-SO$_3$H)-NH-phenyl(3-SO$_3$H)(4-NH$_2$)] | 3-aminophenyl-SO$_2$C$_2$H$_4$OSO$_3$H | 3-aminophenyl-SO$_2$C$_2$H$_4$OSO$_3$H | Brilliant blue |
| 2 | " | 3-(N-ethylamino)phenyl-SO$_2$C$_2$H$_4$OSO$_3$H | | Brilliant blue |
| 3 | " | 3-amino-4-methoxyphenyl-SO$_2$C$_2$H$_4$OSO$_3$H | 4-aminophenyl-SO$_2$C$_2$H$_4$OSO$_3$H | Brilliant blue |
| 4 | " | 4-aminophenyl-SO$_2$C$_2$H$_4$OSO$_3$H | 4-aminophenyl-SO$_2$C$_2$H$_4$OSO$_3$H | Brilliant blue |
| 5 | " | 4-(N-methylamino)phenyl-SO$_2$C$_2$H$_4$OSO$_3$H | 4-amino-2-methoxy-5-methylphenyl-SO$_2$C$_2$H$_4$OSO$_3$H | Brilliant blue |

-continued

| Run No. | Column 1 | Column 2 | Column 3 | Column 4 |
|---|---|---|---|---|
| 6 | " | 4-amino-5-sulfo-2-naphthyl with SO₂C₂H₄OSO₃H (H₂N, SO₃H, SO₂C₂H₄OSO₃H on naphthalene) | 3-aminophenyl-SO₂C₂H₄OSO₃H (H₂N on ring, SO₂C₂H₄OSO₃H meta) | Brilliant blue |
| 7 | Anthraquinone derivative: 1-NH₂, 2-SO₃H, 4-NH-(phenyl)-NH-(phenyl-SO₃H)-NH₂ | 4-aminophenyl-SO₂C₂H₄OSO₃H | " | Brilliant blue |
| 8 | " | 4-amino-3-chlorophenyl-SO₂C₂H₄OSO₃H | 4-amino-2-methoxyphenyl-SO₂C₂H₄OSO₃H (OCH₃, SO₂C₂H₄OSO₃H, H₂N) | Brilliant blue |
| 9 | " | 3-aminophenyl-SO₂C₂H₄OSO₃H | 2-aminophenyl-SO₂C₂H₄OSO₃H | Brilliant blue |
| 10 | " | 4-aminophenyl-SO₂C₂H₄OSO₃H | 4-aminophenyl-SO₂C₂H₄OSO₃H | Brilliant blue |

| Run No. | Column 1 | Column 2 | Column 3 | Column 4 |
|---|---|---|---|---|
| 11 | anthraquinone dye structure with NH₂, SO₃H, O, NH, SO₃H, NH₂ substituents | 3-aminophenyl-SO₂C₂H₄OSO₃H | " | Brilliant blue |
| 12 | " | 4-amino-3-ethylphenyl-SO₂C₂H₄OSO₃H | 3-aminophenyl-SO₂CH=CH₂ | Brilliant blue |
| 13 | " | 4-amino-3-methylphenyl-SO₂C₂H₄OSO₃H | 3-aminophenyl-SO₂C₂H₄OCOCH₃ | Brilliant blue |
| 14 | " | 3-(N-ethylamino)phenyl-SO₂C₂H₄OSO₃H | 6-amino-2-naphthyl-SO₂C₂H₄OCOCH₃ | Brilliant blue |
| 15 | " | 4-aminophenyl-SO₂C₂H₄OSO₃H | 4-aminophenyl-SO₂C₂H₄Cl | Brilliant blue |
| 16 | " | 4-aminophenyl-SO₂CH=CH₂ | 2,5-dimethoxy-4-aminophenyl-SO₂C₂H₄OSO₃H | Brilliant blue |

-continued

| Run No. | Column 1 | Column 2 | Column 3 | Column 4 |
|---|---|---|---|---|
| 17 | 1-amino-4-[(4-{[4-amino-3-sulfophenyl]amino}phenyl)amino]-2-sulfoanthraquinone | 4-methoxy-3-amino-phenyl-SO$_2$C$_2$H$_4$OSO$_3$H | 3-amino-phenyl-SO$_2$C$_2$H$_4$OPO$_3$H$_2$ | Brilliant blue |
| 18 | ″ | 2-methoxy-4-amino-phenyl-SO$_2$C$_2$H$_4$OSO$_3$H | 6-amino-2-naphthyl-SO$_2$C$_2$H$_4$OSO$_3$H | Brilliant blue |
| 19 | ″ | 4-amino-phenyl-SO$_2$C$_2$H$_4$OSO$_3$H | 3-amino-phenyl-SO$_2$C$_2$H$_4$OSO$_3$H | Brilliant blue |
| 20 | ″ | 2,5-dimethoxy-4-amino-phenyl-SO$_2$C$_2$H$_4$OSO$_3$H | ″ | Brilliant blue |
| 21 | 1-amino-4-[(4-{[4-amino-2,5-disulfophenyl]amino}-3-sulfophenyl)amino]-2-sulfoanthraquinone | 4-amino-phenyl-SO$_2$CH=CH$_2$ | 6-amino-1-naphthyl-SO$_2$C$_2$H$_4$OSO$_3$H | Brilliant blue |

-continued

| Run No. | Column 1 | Column 2 | Column 3 | Column 4 |
|---|---|---|---|---|
| 22 | " | H₂N—⟨benzene⟩—SO₂C₂H₄OSO₃H (para) | H₂N—⟨naphthalene⟩(—SO₂C₂H₄OSO₃H)(—SO₃H) | Brilliant blue |
| 23 | " | H₂N—⟨benzene⟩—SO₂C₂H₄OSO₃H (meta) | H₂N—⟨benzene⟩—SO₂C₂H₄OSO₃H (para) | Brilliant blue |
| 24 | anthraquinone with NH₂, SO₃H, NH—C₆H₄—NH—C₆H₄—NH₂ substituents | H₂N—⟨benzene⟩—SO₂C₂H₄OSO₃H (para) | H₂N—⟨benzene⟩—SO₂C₂H₄OSO₃H (meta) | Brilliant blue |

EXAMPLE 7

1-Amino-4-bromoanthraquinone-2-sulfonic acid and 4-(β-acetylaminoethylamino)aniline-3-sulfonic acid were subjected to Ullmann condensation in the presence of cuprous chloride as a catalyst, followed by hydrolysis of the acetyl group under an acid condition of hydrochloric acid, thereby obtaining an anthraquinone intermediate compound of the following formula (2) in the free acid form.

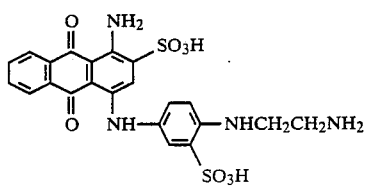

The above intermediate compound (26.6 parts) was subjected to first condensation in an aqueous medium with cyanuric chloride (9.3 parts) in a usual manner, followed by second condensation with 1-aminobenzene-4-β-sulfatoethylsulfone (14.1 parts). Successively, the resulting condensate was subjected to third condensation with 1-aminobenzene-3-β-sulfatoethylsulfone (14.1 parts) at 60° to 70° C. under a weak acid condition. The reaction mixture was salted-out to separate crystals, thereby obtaining an anthraquinone compound of the following formula in the free acid form.

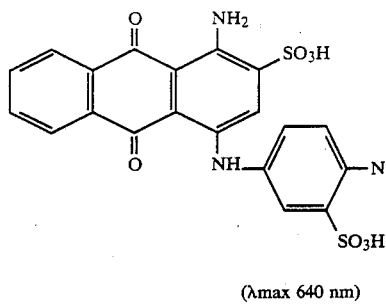

(λmax 640 nm)

EXAMPLE 8

Example 7 was repeated, provided that the intermediate compound of the formula (2), 1-aminobenzene-4-β-sulfatoethylsulfone and 1-aminobenzene-3-β-sulfatoethylsulfone were replaced by the respective compounds shown in Columns 1, 2 and 3 of the following table, thereby obtaining the corresponding anthraquinone compound of a shade on cellulose fibers as shown in Column 4.

These compounds show the aforementioned beneficial properties of the present invention.

| Run No. | Column 1 | Column 2 | Column 3 | Column 4 |
|---|---|---|---|---|
| 1 | 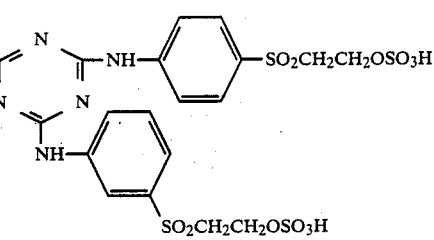 | $H_2N$—⟨⟩—$SO_2C_2H_4OSO_3H$ | $H_2N$—⟨⟩(—$OCH_3$)—$SO_2C_2H_4OSO_3H$ | Brilliant blue |
| 2 | " | $C_2H_5$–HN—⟨⟩—$SO_2C_2H_4OSO_3H$ | $H_2N$—⟨⟩—$SO_2C_2H_4OSO_3H$ | Brilliant blue |
| 3 | " | $H_2N$—⟨⟩—$SO_2C_2H_4OSO_3H$ | $H_2N$—(naphthyl)—$SO_2C_2H_4OSO_3H$ | Brilliant blue |
| 4 | " | $H_2N$—⟨⟩—$SO_2C_2H_4Cl$ | $CH_3O$–$H_2N$—⟨⟩(—$OCH_3$)—$SO_2C_2H_4OSO_3H$ | Brilliant blue |

-continued

| Run No. | Column 1 | Column 2 | Column 3 | Column 4 |
|---|---|---|---|---|
| 5 | 1-amino-4-[(4-(3-aminopropylamino)-2-sulfophenyl)amino]anthraquinone-2-sulfonic acid (anthraquinone with NH$_2$, SO$_3$H on top ring; NH-phenyl(SO$_3$H)-NHCH$_2$CH$_2$CH$_2$NH$_2$ on bottom) | H$_2$N—C$_6$H$_4$—SO$_2$CH=CH$_2$ | H$_2$N-naphthyl-SO$_2$C$_2$H$_4$OSO$_3$H | Brilliant blue |
| 6 | " | CH$_3$HN—C$_6$H$_4$—SO$_2$CH=CH$_2$ | H$_2$N—C$_6$H$_4$—SO$_2$C$_2$H$_4$OSO$_3$H | Brilliant blue |
| 7 | " | H$_2$N—C$_6$H$_4$—SO$_2$C$_2$H$_4$OSO$_3$H | HN—C$_6$H$_4$—SO$_2$C$_2$H$_4$OSO$_3$H | Brilliant blue |
| 8 | 1-amino-4-[(4-(4-aminobutylamino)-2-sulfophenyl)amino]anthraquinone-2-sulfonic acid (anthraquinone with NH$_2$, SO$_3$H; NH-phenyl(SO$_3$H)-NH—(CH$_2$)$_4$—NH$_2$) | H$_2$N—C$_6$H$_4$—SO$_2$C$_2$H$_4$OSO$_3$H | " | Brilliant blue |

DYEING EXAMPLE 4

The anthraquinone compound obtained in Example 5 (each 0.1, 0.3 and 0.6 part) was dissolved in water (200 parts), and then sodium sulfate (20 parts) and cotton (10 parts) were added thereto. The bath was heated to 60° C., and 30 minutes thereafter, sodium carbonate (3 parts) was added thereto. Dyeing was continued for 1 hour at that temperature. Thereafter, the cotton taken out was washed with water and soaped to obtain each dyed product of a brilliant blue color superior in fastness properties, particularly light fastness and perspiration-light fastness with excellent build-up property.

The compound was also found to have superior solubility, level-dyeing property and reproducibility of the dyeing.

DYEING EXAMPLE 5

The anthraquinone compound obtained in Run No. 7 of Example 6 (0.3 part) was dissolved in water (200 parts), and sodium sulfate (20 parts) and cotton (10 parts) were added thereto. The bath was heated to 60° C., and 20 minutes thereafter, trisodium phosphate (3 parts) was added thereto. Dyeing was continued for 1 hour at that temperature. Thereafter, the cotton taken out was washed with water and soaped to obtain a dyed product of a brilliant blue color superior in fastness properties.

DYEING EXAMPLE 7

| Composition of printing paste | Parts |
|---|---|
| Anthraquinone compound obtained in Example 7 | 5 |
| Urea | 5 |
| Sodium alginate (5%), thickner | 50 |
| Hot water | 25 |
| Sodium hydrogencarbonate | 2 |
| Balance (water) | 13 |

Mercerized cotton broad cloth was printed with the printing paste of the above composition, pre-dried, steamed at 100° C. for 5 minutes, washed with hot water, soaped, again washed with hot water and dried, to obtain a printed product of a brilliant blue color superior in fastness properties.

EXAMPLE 9

1-Amino-4-(3'-amino-2',4',6'-trimethyl-5'-sulfoanilino)anthraquinone-2-sulfonic acid (23.7 parts), cyanuric chloride (9.3 parts) and 1-aminobenzene-3-β-sulfatoethylsulfone (14.1 parts) were subjected to condensation in an aqueous medium one after another in a usual manner. Successively, the resulting condensate was further subjected to condensation with aniline (4.7 parts) at 60° to 70° C. under a weak acid condition. Thereafter, the reaction mixture was salted-out to separate crystals, thereby obtaining an anthraquinone compound of the following formula in the free acid form.

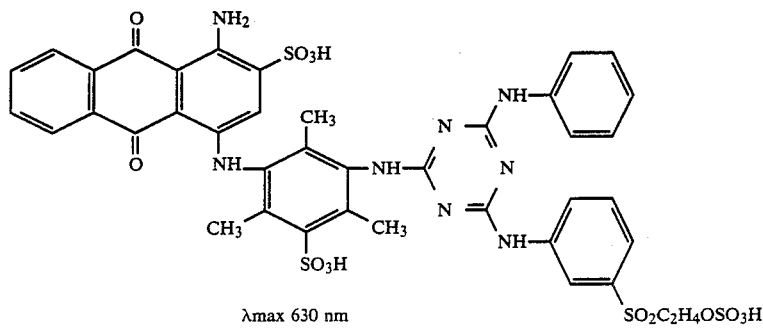

λmax 630 nm

EXAMPLE 10

Example 9 was repeated, provided that 1-amino-4-(3'-amino-2',4',6'-trimethyl-5'-sulfoanilino)anthraquinone-2-sulfonic acid, 1-aminobenzene-3-β-sulfatoethylsulfone and aniline were replaced by the respective compounds shown in Columns 1, 2 and 3 of the following table, respectively, thereby obtaining the corresponding anthraquinone compound of a shade on cellulose fibers as shown in Column 4.

These compounds show the aforementioned beneficial properties of the present invention.

| Run No. | Column 1 | Column 2 | Column 3 | Column 4 |
|---|---|---|---|---|
| 1 | 1-amino-4-[(2,6-dimethyl-3-amino-4-methyl-5-sulfo)phenylamino]-2-sulfoanthraquinone | 3-amino-phenyl-SO₂C₂H₄OSO₃H | N-ethyl-4-chloroaniline | Brilliant blue |
| 2 | " | 3-(N-ethylamino)phenyl-SO₂C₂H₄OSO₃H | 4-chloroaniline | " |
| 3 | " | 2-methoxy-5-amino-phenyl-SO₂C₂H₄OSO₃H | 3-methylaniline | " |
| 4 | " | 4-amino-phenyl-SO₂C₂H₄OSO₃H | 3-aminobenzenesulfonic acid | " |
| 5 | 1-amino-4-[(2,6-dimethyl-3-amino-4-methyl-5-sulfo)phenylamino]-2-sulfoanthraquinone | 4-(N-methylamino)phenyl-SO₂C₂H₄OSO₃H | aniline | Brilliant blue |

-continued

| Run No. | Column 1 | Column 2 | Column 3 | Column 4 |
|---|---|---|---|---|
| 6 | " | naphthalene with SO₃H and SO₂C₂H₄OSO₃H, NH₂ | 4-methoxyaniline (H₂N–C₆H₄–OCH₃) | " |
| 7 | anthraquinone with NH₂, SO₃H, NH-(C₆H₃(SO₃H)(NH₂)) | H₂N–C₆H₄–SO₂C₂H₄OSO₃H | diphenylamine (HN(C₆H₅)) | " |
| 8 | " | 2-chloro-4-(SO₂C₂H₄OSO₃H)aniline | H₂N–C₆H₄–SO₃H | " |
| 9 | anthraquinone with NH₂, SO₃H, NH-(C₆H₃(SO₃H)(NH₂)) | 3-aminophenyl-SO₂C₂H₄OSO₃H | 6-amino-2-naphthalenesulfonic acid | Brilliant blue |
| 10 | anthraquinone with NH₂, SO₃H, NH-(C₆H₄–NH₂) | H₂N–C₆H₄–SO₂C₂H₄OSO₃H | 4-chloroaniline | " |

-continued

| Run No. | Column 1 | Column 2 | Column 3 | Column 4 |
|---|---|---|---|---|
| 11 | 1-amino-4-(3-aminoanilino)-2-sulfo anthraquinone | 3-aminophenyl-SO₂C₂H₄OSO₃H | 3-aminobenzenesulfonic acid (H₂N–C₆H₄–SO₃H, meta) | " |
| 12 | 1-amino-4-(2-amino-4-sulfo-5-methylanilino)-2-sulfo anthraquinone | 4-amino-3-ethylphenyl-SO₂C₂H₄OSO₃H | 4-chloroaniline | " |
| 13 | " | 5-amino-2-methylphenyl-SO₂C₂H₄OSO₃H | aniline | Brilliant blue |
| 14 | 2-amino-4-[(2-aminomethyl-4-methylanilino)]-6,7-disulfo anthraquinone | 3-aminophenyl-SO₂C₂H₄OSO₃H | N-methylaniline | " |

-continued

| Run No. | Column 1 | Column 2 | Column 3 | Column 4 |
|---|---|---|---|---|
| 15 | anthraquinone with NH₂, SO₃H, SO₃H, NH-phenyl(CH₂NH₂) | H₂N-C₆H₄-SO₂C₂H₄OSO₃H | H₂N-C₆H₄-COOH | " |
| 16 | anthraquinone with NH₂, SO₃H, SO₃H, NH-phenyl(CH₂NH₂) | H₂N-C₆H₄-SO₂CH=CH₂ | C₆H₅-NH-C₂H₅ | Brilliant blue |
| 17 | anthraquinone with NH₂, SO₃H, CH₃, NH-phenyl(CH₂NH₂, SO₃H, CH₃) | H₂N-C₆H₃(OCH₃)-SO₂C₂H₄OSO₃H | H₂N-C₆H₄-CH₃ (m) | " |
| 18 | anthraquinone with NH₂, SO₃H, OCH₃, NH-phenyl(CH₂NH₂, SO₃H) | H₂N-C₆H₃(OCH₃)-SO₂C₂H₄OSO₃H | H₂N-naphthyl-SO₃H | " |

-continued

| Run No. | Column 1 | Column 2 | Column 3 | Column 4 |
|---|---|---|---|---|
| 19 | 1-amino-4-[(2,6-dimethyl-3-amino-4-methyl)phenylamino]anthraquinone-2-sulfonic acid | 4-aminophenyl-SO₂C₂H₄OSO₃H | H₂N—C₃H₇ | Brilliant blue |
| 20 | 1-amino-4-[(2-aminomethyl-4-methoxy)phenylamino]anthraquinone-2-sulfonic acid | 2,5-dimethoxy-4-amino-phenyl-SO₂C₂H₄OSO₃H | 6-amino-naphthalene-1-sulfonic acid | " |
| 21 | 1-amino-4-[(2-aminomethyl-4-sulfo)phenylamino]anthraquinone-2-sulfonic acid | 4-aminophenyl-SO₂CH=CH₂ | aniline | " |
| 22 | 1-amino-4-[(2-aminomethyl-4-ethyl)phenylamino]anthraquinone-2-sulfonic acid | 4-aminophenyl-SO₂C₂H₄OCOCH₃ | 4-chloroaniline | Brilliant blue |

-continued

| Run No. | Column 1 | Column 2 | Column 3 | Column 4 |
|---|---|---|---|---|
| 23 | 1-amino-4-[(4-(methylaminomethyl)-2-sulfophenyl)amino]-anthraquinone-2-sulfonic acid (NH$_2$, SO$_3$H on anthraquinone; NH-phenyl with CH$_2$NHCH$_3$ and SO$_3$H) | 2-amino-1-ethoxy-4-(β-sulfatoethylsulfonyl)benzene (OC$_2$H$_5$, H$_2$N, SO$_2$C$_2$H$_4$OSO$_3$H) | H$_2$N—CH$_3$ | " |
| 24 | analogous anthraquinone (NH$_2$, SO$_3$H; NH-phenyl with CH$_2$NHCH$_3$, SO$_3$H) | " | N-methylaniline (C$_6$H$_5$-NH-CH$_3$) | " |
| 25 | analogous anthraquinone (NH$_2$, SO$_3$H; NH-phenyl with CH$_2$NHC$_2$H$_5$, SO$_3$H) | 2-amino-1-methyl-4-(β-sulfatoethylsulfonyl)benzene (CH$_3$, H$_2$N, SO$_2$C$_2$H$_4$OSO$_3$H) | 4-aminobenzenesulfonic acid (H$_2$N—C$_6$H$_4$—SO$_3$H) | " |
| 26 | anthraquinone with NH$_2$, SO$_3$H, SO$_3$H and NH-phenyl (CH$_2$NH$_2$, SO$_3$H) | 3-amino-(β-sulfatoethylsulfonyl)benzene (H$_2$N—C$_6$H$_4$—SO$_2$C$_2$H$_4$OSO$_3$H) | " | Brilliant blue |

| Run No. | Column 1 | Column 2 | Column 3 | Column 4 |
|---|---|---|---|---|
| 27 | anthraquinone with NH2, SO3H, HO3S, HO3S, NH-phenyl-CH2NH-CH3 | H2N-naphthalene-SO2C2H4OSO3H | H2N—CH2—phenyl | " |
| 28 | anthraquinone with NH2, SO3H, NH-phenyl(CH2NH2)(SO3H) | C2H4OH-HN-phenyl-SO2C2H4OSO3H | H2N—CH2—phenyl | Brilliant blue |
| 29 | anthraquinone with NH2, SO3H, NH-phenyl-CH2NH2 | C2H4CONH2-HN-phenyl-SO2C2H4OSO3H | C2H5-phenyl-NH2 | " |
| 30 | anthraquinone with NH2, SO3H, NH-phenyl(CH3)(CH2NH2)(SO3H) | C2H4COOH-HN-phenyl-SO2C2H4OSO3H | H2N-phenyl | " |

| Run No. | Column 1 | Column 2 | Column 3 | Column 4 |
|---|---|---|---|---|
| 31 | (anthraquinone structure with NH₂, SO₃H, NH-aryl(CH₂NH₂, CH₃, SO₃H)) | C₃H₇-n-NH-C₆H₄-SO₂C₂H₄OSO₃H | H₂N-naphthalene-(SO₃H)₂ | Brilliant blue |
| 32 | (anthraquinone with NH₂, SO₃H, NH-cyclohexyl-NH₂) | H₂N-C₆H₄-SO₂C₂H₄OSO₃H | H₂N-C₆H₅ | " |
| 33 | " | H₂N-C₆H₃(OCH₃)-SO₂C₂H₄OSO₃H | H₂N-C₆H₄-SO₃H | " |
| 34 | " | C₂H₅-NH-C₆H₄-SO₂C₂H₄OSO₃H | H₂N-naphthalene-SO₃H | " |
| 35 | (anthraquinone with NH₂, SO₃H, NH-cyclohexyl-NH₂) | H₂N-C₆H₄-SO₂C₂H₄OSO₃H | C₂H₅-NH-C₆H₄-Cl | Brilliant blue |

-continued

| Run No. | Column 1 | Column 2 | Column 3 | Column 4 |
|---|---|---|---|---|
| 36 | (anthraquinone with NH2, SO3H, NH-cyclohexyl-NH2, HO3S) | 4-aminophenyl-SO2C2H4OSO3H | aniline (H2N-C6H5) | " |
| 37 | (anthraquinone with NH2, SO3H, NH-cyclohexyl-NH2, HO3S) | 3-aminophenyl-SO2C2H4OSO3H | H2N—C2H5 | " |
| 38 | (anthraquinone with NH2, SO3H, NH-cyclohexyl-NH2) | 4-aminophenyl-SO2C2H4OSO3H | 4-chloroaniline | " |
| 39 | (anthraquinone with NH2, SO3H, NH-cyclohexyl-NH2, HO3S) | 4-amino-2-methylphenyl-SO2C2H4OSO3H | H2N—CH2—C6H5 | Brilliant blue |

-continued

| Run No. | Column 1 | Column 2 | Column 3 | Column 4 |
|---|---|---|---|---|
| 40 | (anthraquinone structure with NH₂, SO₃H, NH-cyclohexyl-NH₂, SO₃H groups) | 3-aminophenyl-SO₂C₂H₄Cl | H₂N—C₃H₇ | " |
| 41 | (anthraquinone structure with NH₂, SO₃H, NH-cyclohexyl-NH₂, HO₃S, HO₃S groups) | 4-aminophenyl-SO₂CH=CH₂ | H₂N—CH₂—phenyl | " |
| 42 | (anthraquinone structure with NH₂, SO₃H, CH₃, NH-cyclohexyl-NH₂ groups) | 4-aminophenyl-SO₂C₂H₄OSO₃H | 4-H₂N-phenyl-SO₃H | " |
| 43 | (anthraquinone structure with NH₂, SO₃H, NH-cyclohexyl(CH₃)-NH₂ groups) | 3-aminophenyl-SO₂C₂H₄OSO₃H | phenyl-NH-C₂H₄COOH | Brilliant blue |

-continued

| Run No. | Column 1 | Column 2 | Column 3 | Column 4 |
|---|---|---|---|---|
| 44 | 1-amino-4-[(4-amino-3,3-dimethylcyclohexyl)amino]anthraquinone | 4-aminophenyl-SO₂C₂H₄OSO₃H | 3-chloroaniline | " |
| 45 | 1-amino-2-sulfo-4-[(4-methylaminocyclohexyl)amino]anthraquinone | 4-aminophenyl-SO₂C₂H₄OSO₃H (3-chloro) | 6-amino-2-naphthalenesulfonic acid | " |
| 46 | 1-amino-2-sulfo-4-[(4-ethylaminocyclohexyl)amino]anthraquinone | 4-aminophenyl-SO₂C₂H₄OCOCH₃ | " | " |
| 47 | 1-amino-2-sulfo-4-[(4-(2-carboxyethyl)aminocyclohexyl)amino]anthraquinone | 6-amino-2-naphthyl-SO₂C₂H₄OSO₃H | 4-chloroaniline | Brilliant blue |

-continued

| Run No. | Column 1 | Column 2 | Column 3 | Column 4 |
|---|---|---|---|---|
| 48 | 1-NH2, 2-SO3H, 4-NH-(4-aminocyclohexyl) anthraquinone | 3-(N-C2H5)amino-phenyl-SO2C2H4OSO3H | H2NCH2CH2SO3H | " |
| 49 | " | 3-(N-C2H4COOH)amino-phenyl-SO2CH=CH2 | aniline (H2N-C6H5) | " |
| 50 | " | 3-(N-C3H7)amino-phenyl-SO2C2H4OSO3H | 3-aminobenzenesulfonic acid | " |
| 51 | 1-NH2, 2-SO3H, 4-NH-(3-aminocyclohexyl) anthraquinone | 3-(N-C2H4CONH2)amino-phenyl-SO2C2H4OSO3H | H2NCH2CH2SO3H | Brilliant blue |
| 52 | " | 3-(N-C2H4OH)amino-phenyl-SO2C2H4OSO3H | " | " |

-continued
| Run No. | Column 1 | Column 2 | Column 3 | Column 4 |
|---|---|---|---|---|
| 53 | 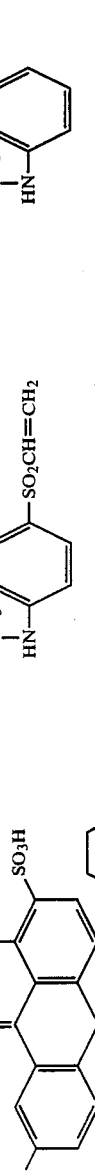 |  | 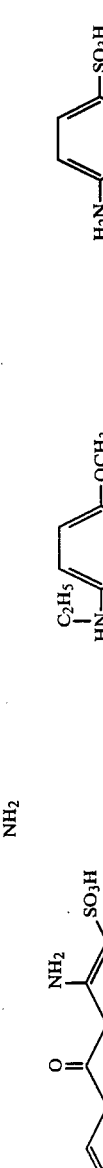 | " |
| 54 | 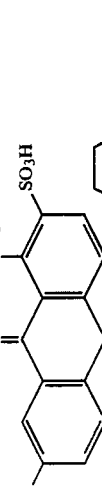 | 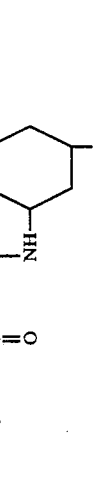 |  | Brilliant blue |
| 55 | " | 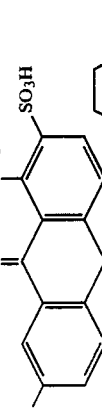 | H$_2$NCH$_2$CH$_2$SO$_3$H | " |

EXAMPLE 11

1-Amino-4-(3'-aminopropylamino)anthraquinone-2-sulfonic acid (20 parts), cyanuric chloride (9.3 parts) and 1-aminobenzene-4-β-sulfatoethylsulfone (14.1 parts) were subjected to condensation in an aqueous medium one after another in a usual manner. Successively, the resulting condensate was further subjected to condensation with aniline (4.7 parts) at 60° to 70° C. under a weak acid condition. Thereafter, the reaction mixture was salted-out to separate crystals, thereby obtaining an anthraquinone compound of the following formula in the free acid form.

EXAMPLE 12

Example 11 was repeated, provided that 1-amino-4-(3'-aminopropylamino)anthraquinone-2-sulfonic acid, 1-aminobenzene-4-β-sulfatoethylsulfone and aniline were replaced by the respective compounds shown in Columns 1, 2 and 3 of the following table, respectively, thereby obtaining the corresponding anthraquinone compound of a shade on cellulose fibers as shown in column 4.

These compounds show the aforementioned beneficial properties of the present invention.

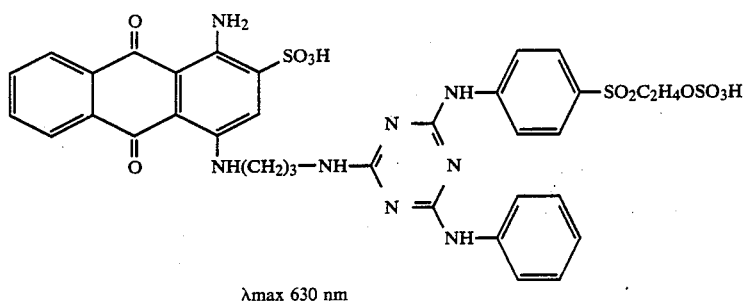

λmax 630 nm

| Run No. | Column 1 | Column 2 | Column 3 | Column 4 |
|---|---|---|---|---|
| 1 | 1-amino-4-(6-aminohexylamino)anthraquinone-2-sulfonic acid | HN–C6H4–SO2C2H4OSO3H | H2N–C6H4–SO3H (meta) | Brilliant blue |
| 2 | 1-amino-4-(3-aminopropylamino)-6(or 7)-sulfoanthraquinone-2-sulfonic acid | HN–C6H4–SO2C2H4OSO3H (meta) | H2N–C6H5 | Brilliant blue |
| 3 | 1-amino-4-(2-aminoethylamino)anthraquinone-2-sulfonic acid | HN–C6H4–SO2C2H4OSO3H | H2N–C6H4–SO3H | Brilliant blue |
| 4 | 1-amino-4-(3-aminopropylamino)-6-sulfoanthraquinone-2-sulfonic acid | HN–C6H4–SO2C2H4Cl (meta) | 3-Cl-4-H2N–C6H3–SO3H | Brilliant blue |
| 5 | 1-amino-4-(4-aminobutylamino)-5,8-disulfoanthraquinone-2-sulfonic acid | H2N–C6H4–SO2CH=CH2 | H2N–C6H5 | Brilliant blue |
| 6 | 1-amino-4-(5-aminopentylamino)-6-sulfoanthraquinone-2-sulfonic acid | CH3(N)–HN–C6H4–SO2CH=CH2 | CH3(N)–HN–C6H5 | Brilliant blue |

-continued

| Run No. | Column 1 | Column 2 | Column 3 | Column 4 |
|---|---|---|---|---|
| 7 | anthraquinone structure with NH₂, SO₃H, NH-biphenyl-NH₂, SO₃H | H₂N-C₆H₄-SO₂C₂H₄OSO₃H | H₂N-C₆H₅ | Brilliant blue |
| 8 | anthraquinone structure with NH₂, SO₃H, NH-biphenyl(SO₃H)₂-NH₂ | H₂N-C₆H₄-SO₂C₂H₄OSO₃H | H₂N-C₆H₄-SO₃H | Brilliant blue |
| 9 | HO₃S-anthraquinone with NH₂, SO₃H, NH-biphenyl(SO₃H)-NH₂ | H₂N-C₆H₃(CH₃)-SO₂C₂H₄Cl | H₂N—C₂H₄—SO₃H | Brilliant blue |
| 10 | HO₃S-anthraquinone with NH₂, SO₃H, NH-biphenyl(SO₃H)-NH₂ | H₂N-C₆H₃(Cl)-SO₂C₂H₄OSO₃H | H₂N-naphthyl-SO₃H | Brilliant blue |
| 11 | anthraquinone structure with NH₂, SO₃H, NH-biphenyl(SO₃H)-NH₂ | H₂N-C₆H₄-SO₂C₂H₄OSO₃H | H₂N-naphthyl-SO₃H | Brilliant blue |

EXAMPLE 13

1-Amino-4-bromoanthraquinone-2-sulfonic acid and 4-[(4'-amino-3'-sulfo)phenylamino]aniline-3-sulfonic acid were subjected to Ullmann condensation in the presence of cuprous chloride as a catalyst, thereby obtaining an anthraquinone intermediate compound of the following formula (1) in the free acid form.

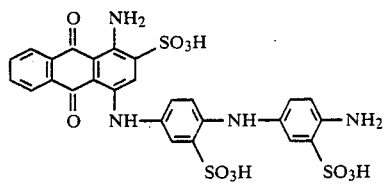

(1)

The above intermediate compound (33 parts) was subjected to first condensation in an aqueous medium with cyanuric chloride (9.3 parts) in a usual manner, followed by second condensation with 1-aminobenzene-3-β-sulfatoethylsulfone (14.1 parts). Successively, the resulting condensate was subjected to third condensation with N-methylaniline (5.4 parts) at 60° to 70° C. under a wask acid condition. The reaction mixture was salted-out to separate crystals, thereby obtaining an anthraquinone compound of the following formula in the free acid form.

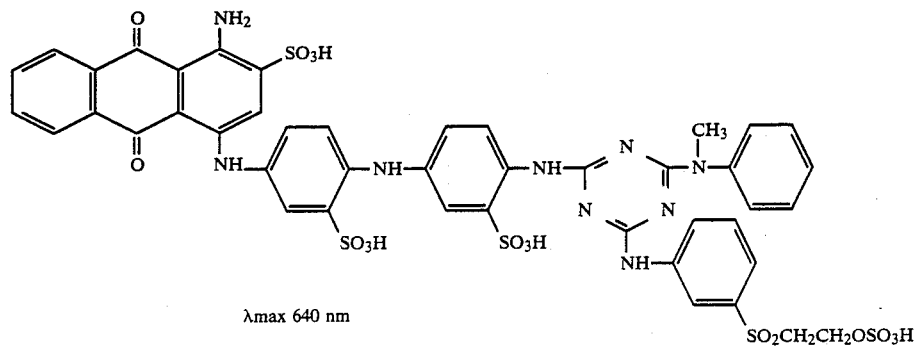

λmax 640 nm

EXAMPLE 14

Example 13 was repeated, provided that the intermediate compound of the formula (1), 1-aminobenzene-3-β-sulfatoethylsulfone and N-methylaniline were replaced by the respective compounds shown in Columns 1, 2 and 3 of the following table, thereby obtaining the corresponding anthraquinone compound of a shade on cellulose fibers as shown in Column 4.

These compounds show the aforementioned beneficial properties of the present invention.

| Run No. | Column 1 | Column 2 | Column 3 | Column 4 |
|---|---|---|---|---|
| 1 | [anthraquinone-NH₂, SO₃H, NH-Ph(SO₃H)-NH-Ph(SO₃H)-NH₂ structure] | H₂N—Ph—SO₂C₂H₄OSO₃H | H₂N—Ph | Brilliant blue |
| 2 | " | C₂H₅-NH—Ph—SO₂C₂H₄OSO₃H | H₂N—Ph | Brilliant blue |
| 3 | " | CH₃O-Ph(H₂N)—SO₂C₂H₄OSO₃H | H₂N—Ph—Cl | Brilliant blue |
| 4 | [anthraquinone-NH₂, SO₃H, NH-Ph(SO₃H)-NH-Ph(SO₃H)-NH₂ structure] | H₂N—Ph—SO₂C₂H₄OSO₃H | H₂N—Ph—SO₃H | Brilliant blue |
| 5 | " | CH₃-NH—Ph—SO₂C₂H₄OSO₃H | H₂NCH₂CH₂SO₃H | Brilliant blue |
| 6 | " | NH—naphthalene(SO₃H)—SO₂C₂H₄OSO₃H | C₂H₅-HN—Ph—Cl | Brilliant blue |
| 7 | [anthraquinone-NH₂, SO₃H, NH-Ph(SO₃H)-NH-Ph-NH₂ structure] | H₂N—Ph—SO₂C₂H₄OSO₃H | H₂N—Ph—SO₃H | Brilliant blue |

-continued

| Run No. | Column 1 | Column 2 | Column 3 | Column 4 |
|---|---|---|---|---|
| 8 | 1-amino-4-[(4-(4-aminophenylamino)-2-sulfophenyl)amino]-9,10-dioxoanthracene-2-sulfonic acid | 3-chloro-4-amino-phenyl-$SO_2C_2H_4OSO_3H$ | 7-amino-naphthalene-1,5-disulfonic acid ($H_2N$—naphthyl—$SO_3H$, $SO_3H$) | Brilliant blue |
| 9 | " | 3-diazonium-phenyl-$SO_2C_2H_4OSO_3H$ ($N_2H$—C$_6H_4$—$SO_2C_2H_4OSO_3H$) | $H_2NCH_2CH_2SO_3H$ | Brilliant blue |
| 10 | " | $H_2N$—C$_6H_4$—$SO_2C_2H_4OSO_3H$ | $H_2N$—C$_6H_5$ | Brilliant blue |
| 11 | 1-amino-4-[(4-(4-amino-3-sulfophenylamino)-2-sulfophenyl)amino]-9,10-dioxoanthracene-2-sulfonic acid | 3-amino-phenyl-$SO_2C_2H_4OSO_3H$ | $H_2N$—C$_6H_5$ | Brilliant blue |
| 12 | (same anthraquinone as Run 11) | 2-ethyl-4-amino-phenyl-$SO_2C_2H_4OSO_3H$ | N-ethyl-4-chloroaniline ($C_2H_5$—NH—C$_6H_4$—Cl) | Brilliant blue |
| 13 | " | 4-amino-2-methyl-phenyl-$SO_2C_2H_4OSO_3H$ | 3-amino-benzenesulfonic acid ($H_2N$—C$_6H_4$—$SO_3H$) | Brilliant blue |
| 14 | " | N-ethyl-3-amino-phenyl-$SO_2C_2H_4OSO_3H$ ($C_2H_5$—HN—C$_6H_4$—$SO_2C_2H_4OSO_3H$) | 6-amino-naphthalene-2-sulfonic acid ($H_2N$—naphthyl—$SO_3H$) | Brilliant blue |
| 15 | " | $H_2N$—C$_6H_4$—$SO_2C_2H_4OSO_3H$ | $H_2NCH_2CH_2SO_3H$ | Brilliant blue |
| 16 | " | $H_2N$—C$_6H_4$—$SO_2CH=CH_2$ | 4-amino-benzenesulfonic acid ($H_2N$—C$_6H_4$—$SO_3H$) | Brilliant blue |
| 17 | 1-amino-4-[(4-(4-amino-2-sulfophenylamino)phenyl)amino]-9,10-dioxoanthracene-2-sulfonic acid | 2-methoxy-4-amino-phenyl-$SO_2C_2H_4OSO_3H$ | 3-amino-benzenesulfonic acid ($H_2N$—C$_6H_4$—$SO_3H$) | Brilliant blue |
| 18 | " | 4-amino-2-methoxy-phenyl-$SO_2C_2H_4OSO_3H$ | N-methylaniline ($CH_3$—HN—C$_6H_5$) | Brilliant blue |
| 19 | " | $H_2N$—C$_6H_4$—$SO_2C_2H_4OSO_3H$ | $H_2NCH_2CH_2SO_3H$ | Brilliant blue |

| Run No. | Column 1 | Column 2 | Column 3 | Column 4 |
|---|---|---|---|---|
| 20 | " | 2,5-dimethoxy-4-(β-sulfatoethylsulfonyl)aniline | $H_2NCH_2CH_2COOH$ | Brilliant blue |
| 21 | [anthraquinone intermediate structure with two arylamino bridges bearing $SO_3H$ and $NH_2$ groups] | $H_2N$–C$_6$H$_4$–$SO_2CH=CH_2$ | $H_2N$–C$_6$H$_5$ | Brilliant blue |
| 22 | " | $H_2N$–C$_6$H$_4$–$SO_2C_2H_4OSO_3H$ | $H_2N$–$C_3H_7$ | Brilliant blue |
| 23 | " | $H_2N$–C$_6$H$_4$–$SO_2C_2H_4OSO_3H$ (meta) | 6-amino-2-naphthalenesulfonic acid | Brilliant blue |
| 24 | [anthraquinone intermediate with –NH–C$_6$H$_4$–NH–C$_6$H$_4$–NH$_2$ bridge] | $H_2N$–C$_6$H$_4$–$SO_2C_2H_4OSO_3H$ | 3-aminobenzenesulfonic acid | Brilliant blue |

EXAMPLE 15

1-Amino-4-bromoanthraquinone-2-sulfonic acid and 4-(β-acetylaminoethylamino)aniline 3-sulfonic acid were subjected to Ullmann condensation in the presence of cuprous chloride as a catalyst, followed by hydrolysis of the acetyl group under an acid condition of hydrochloric acid, thereby obtaining an anthraquinone intermediate compound of the following formula with cyanuric chloride (9.3 parts) in a usual manner, followed by second condensation with 1-aminobenzene-4-β-sulfatoethylsulfone (14.1 parts). Successively, the resulting condensate was subjected to third condensation with 2-naphthylamine-6-sulfonic acid (11.2 parts) at 60° to 70° C. under a weak acid condition. The reaction mixture was salted-out to separate crystals, thereby obtaining an anthraquinone compound of the following formula in the free acid form.

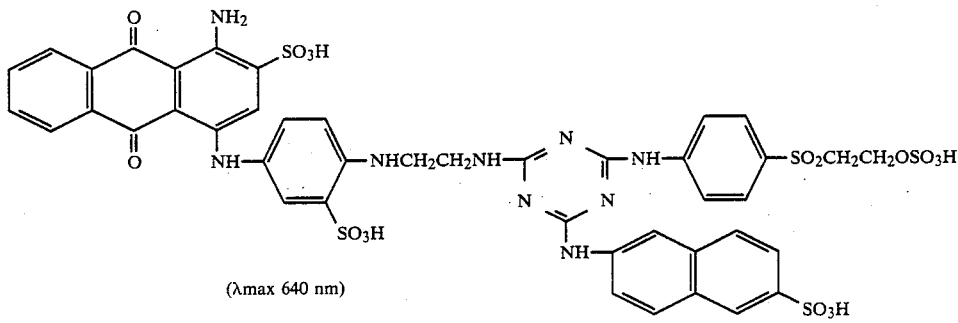

(λmax 640 nm)

(2) in the free acid form

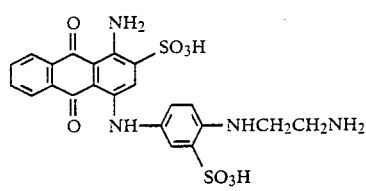

(2)

The above intermediate compound (26.6 parts) was subjected to first condensation in an aqueous medium

EXAMPLE 16

Example 15 was repeated, provided that the intermediate compound of the formula (2), 1-aminobenzene-4-β-sulfatoethylsulfone and 2-naphthylamine-6-sulfonic acid were replaced by the respective compounds shown in Columns 1, 2 and 3 of the following table, thereby obtaining the corresponding anthraquinone compound of a shade on cellulose fibers as shown in Column 4.

These compounds show the aforementioned beneficial properties of the present invention.

| Run No. | Column 1 | Column 2 | Column 3 | Column 4 |
|---|---|---|---|---|
| 1 | 1-amino-4-[(4-(NHCH$_2$CH$_2$NH$_2$)-3-sulfophenyl)amino]anthraquinone-2-sulfonic acid | H$_2$N–C$_6$H$_4$–SO$_2$C$_2$H$_4$OSO$_3$H | H$_2$N–C$_6$H$_5$ | Brilliant blue |
| 2 | " | C$_2$H$_5$–HN–C$_6$H$_4$–SO$_2$C$_2$H$_4$OSO$_3$H | 6-amino-2-naphthalenesulfonic acid (H$_2$N-naphthyl-SO$_3$H) | Brilliant blue |
| 3 | " | H$_2$N–C$_6$H$_4$–SO$_2$C$_2$H$_4$OSO$_3$H | H$_2$N–C$_6$H$_4$–SO$_3$H (meta) | Brilliant blue |
| 4 | " | N$_2$H–C$_6$H$_4$–SO$_2$C$_2$H$_4$Cl | H$_2$NCH$_2$CH$_2$SO$_3$H | Brilliant blue |
| 5 | 1-amino-4-[(4-(NHCH$_2$CH$_2$CH$_2$NH$_2$)-3-sulfophenyl)amino]anthraquinone-2-sulfonic acid | H$_2$N–C$_6$H$_4$–SO$_2$CH=CH$_2$ | H$_2$NCH$_2$CH$_2$SO$_3$H | Brilliant blue |
| 6 | " | CH$_3$–HN–C$_6$H$_4$–SO$_2$CH=CH$_2$ | H$_2$N–C$_6$H$_4$–SO$_3$H | Brilliant blue |
| 7 | " | H$_2$N–C$_6$H$_4$–SO$_2$C$_2$H$_4$OSO$_3$H (meta) | C$_2$H$_5$–HN–C$_6$H$_4$–Cl | Brilliant blue |
| 8 | 1-amino-4-[(4-(NH–(CH$_2$)$_4$–NH$_2$)-3-sulfophenyl)amino]anthraquinone-2-sulfonic acid | H$_2$N–C$_6$H$_4$–SO$_2$C$_2$H$_4$OSO$_3$H (meta) | H$_2$N–C$_6$H$_4$–SO$_3$H (meta) | Brilliant blue |

DYEING EXAMPLE 7

The anthraquinone compound obtained in Example 9 (each 0.1, 0.3 and 0.6 part) was dissolved in water (200 parts), and then sodium sulfate (20 parts) and cotton (10 parts) were added thereto. The bath was heated to 60° C., and 30 minutes thereafter, sodium carbonate (3 parts) was added thereto. Dyeing was continued for 1 hour at that temperature. Thereafter, the cotton taken out was washed with water and soaped to obtain each dyed product of brilliant blue color superior in fastness properties, particularly light fastness and perspiration-light fastness with excellent build-up property.

The compound was also found to have superior solubility, level-dyeing property and reproducibility of the dyeing.

DYEING EXAMPLE 8

The anthraquinone compound obtained in Run No. 7 of Example 10 (0.3 part) was dissolved in water (200 parts), and sodium sulfate (20 parts) and cotton (10 parts) were added thereto. The bath was heated to 60° C., and 20 minutes thereafter, trisodium phosphate (3 parts) was added thereto. Dyeing was continued for 1 hour at that temperature. Thereafter, the cotton taken out was washed with water and soaped to obtain a dyed product of a brilliant blue color superior in fastness properties.

DYEING EXAMPLE 9

The anthraquinone compound obtained in Example 11 (each 0.1, 0.3 and 0.6 part) was dissolved in water (200 parts), and then sodium sulfate (30 parts) and cotton (10 parts) were added thereto. The bath was heated to 70° C., and 30 minutes thereafter, sodium carbonate (3 parts) was added thereto. Dyeing was continued for 1 hour at that temperature. Thereafter, the cotton taken out was washed with water and soaped to obtain each dyed product of brilliant blue color superior in fastness properties, particularly light fastness and perspiration-light fastness with excellent build-up property.

The compound was also found to have superior solubility, level-dyeing property and reproducibility of the dyeing.

DYEING EXAMPLE 10

The anthraquinone compound obtained in Run No. 7 of Example 12 (0.3 part) was dissolved in water (200 parts), and sodium sulfate (30 parts) and cotton (10 parts) were added thereto. The bath was heated to 70° C., and 20 minutes thereafter, trisodium phosphate (3 parts) was added thereto. Dyeing was continued for 1 hour at that temperature. Thereafter, the cotton taken out was washed with water and soaped to obtain a dyed product of a brilliant blue color superior in fastness properties.

DYEING EXAMPLE 11

The anthraquinone compound obtained in Example 13 (each 0.1, 0.3 and 0.6 part) was dissolved in water (200 parts), and then sodium sulfate (20 parts) and cotton (10 parts) were added thereto. The bath was heated to 50° C., and 30 minutes thereafter, sodium carbonate (3 parts) was added thereto. Dyeing was continued for 1 hour at that temperature. Thereafter, the cotton taken out was washed with water and soaped to obtain each dyed product of a brilliant blue color superior in fastness properties, particularly light fastness and perspiration-light fastness with excellent build-up property.

The compound was also found to have superior solubility, level-dyeing property and reproducibility of the dyeing.

DYEING EXAMPLE 12

The anthraquinone compound obtained in Run No. 4 of Example 14 (0.3 part) was dissolved in water (200 parts), and sodium sulfate (20 parts) and cotton (10 parts) were added thereto. The bath was heated to 50° C., and 20 minutes thereafter, trisodium phosphate (3 parts) was added thereto. Dyeing was continued for 1 hour at that temperature. Thereafter, the cotton taken out was washed with water and soaped to obtain a dyed product of a brilliant blue color superior in fastness properties.

DYEING EXAMPLE 13

| Composition of printing paste | |
|---|---|
| | Parts |
| Anthraquinone compound obtained in Example 15 | 5 |
| Urea | 5 |
| Sodium alginate (5%), thickner | 50 |
| Hot water | 25 |
| Sodium hydrogencarbonate | 2 |
| Balance (water) | 13 |

Mercerized cotton broad cloth was printed with the printing paste of the above composition, pre-dried, steamed at 100° C. for 5 minutes, washed with hot water, soaped, again washed with hot water and dried, to obtain a printed product of a brilliant blue color superior in fastness properties.

DYEING EXAMPLE 14

| Composition of printing paste | |
|---|---|
| | Parts |
| Anthraquinone compound obtained in Example 9 | 5 |
| Urea | 5 |
| Sodium alginate (5%), thickner | 50 |
| Hot water | 25 |
| Sodium hydrogencarbonate | 2 |
| Balance (water) | 13 |

Mercerized cotton broad cloth was printed with the printing paste of the above composition, pre-dried, steamed at 120° C. for 5 minutes, washed with hot water, soaped, again washed with hot water and dried, to obtain a printed product of a brilliant blue color superior in fastness properties.

EXAMPLE 17

1-Amino-4-(4'-Aminomethyl-2'-sulfoanilino)anthraquinone-2-sulfonic acid (27.3 parts), cyanuric chloride (9.3 parts) and 1-aminobenzene-3-β-sulfatoethylsulfone (14.1 parts) were subjected to condensation in an aqueous medium one after another in a usual manner. Successively, the resulting condensate was further subjected to condensation with 1-amino-4-(4'-aminomethyl-2'-sulfoanilino)anthraquinone-2-sulfonic acid (24.5 parts) at 60° to 70° C. under a weak acid condition, and thereafter, the reaction mixture was salted-out to separate crystals, thereby obtaining an anthraquinone compound of the following formula in the free acid form.

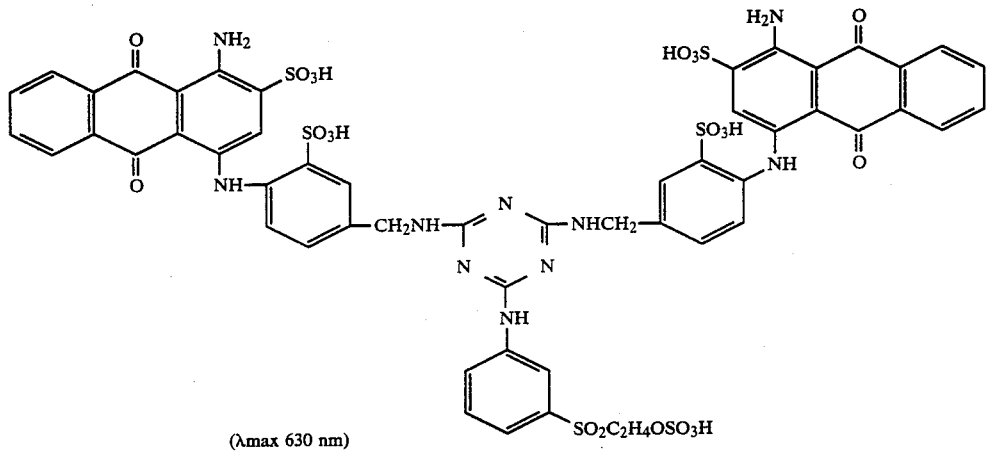

(λmax 630 nm)

EXAMPLE 18

Example 17 was repeated, provided that 1-amino-4-(4'-aminomethyl-2'-sulfoanilino)anthraquinone-2-sulfonic acid and 1-aminobenzene-3-β-sulfatoethylsulfone were replaced by the respective compounds shown in Columns 1 and 2 of the following table, respectively, thereby obtaining the corresponding anthraquinone compound of a color on cellulose fibers as shown in Column 3.

| Run No. | Column 1 | Column 2 | Column 3 |
|---|---|---|---|
| 1 | (anthraquinone with NH2, SO3H, SO3H, NH-phenyl-CH2NH2) | $H_2N$–phenyl–$SO_2C_2H_4OSO_3H$ | Brilliant blue |
| 2 | " | $CH_3O$, $H_2N$ substituted phenyl–$SO_2C_2H_4OSO_3H$ | Brilliant blue |
| 3 | " | $H_2N$–phenyl($CH_3$)–$SO_2C_2H_4OSO_3H$ | Brilliant blue |
| 4 | " | $CH_3$HN–phenyl–$SO_2C_2H_4OSO_3H$ | Brilliant blue |
| 5 | (anthraquinone with NH2, SO3H, SO3H, NH-phenyl-CH2NH2) | $H_2N$–phenyl–$SO_2C_2H_4OSO_3H$ | Brilliant blue |

-continued

| Run No. | Column 1 | Column 2 | Column 3 |
|---|---|---|---|
| 6 | " | H₂N—⟨benzene⟩(OCH₃)(SO₂C₂H₄OSO₃H) | Brilliant blue |
| 7 | " | (C₂H₅)HN—⟨benzene⟩—SO₂C₂H₄OSO₃H | Brilliant blue |
| 8 | " | H₂N—⟨benzene⟩(Cl)—SO₂C₂H₄OSO₃H | Brilliant blue |
| 9 | 1-amino-4-[(2-sulfo-4-methyl-5-aminomethyl-phenyl)amino]-anthraquinone-2-sulfonic acid | H₂N—⟨benzene⟩(C₂H₅)—SO₂C₂H₄OSO₃H | Brilliant blue |
| 10 | " | H₂N—⟨benzene⟩(SO₃H)—SO₂C₂H₄OSO₃H | Brilliant blue |
| 11 | 1-amino-4-[(2,6-dimethyl-3-aminomethyl-5-sulfo-phenyl)amino]-anthraquinone-2-sulfonic acid | H₂N—⟨benzene⟩—SO₂C₂H₄OCOCH₃ | Brilliant blue |
| 12 | 1-amino-4-[(2,6-dimethyl-3-aminomethyl-5-sulfo-phenyl)amino]-anthraquinone-2-sulfonic acid | H₂N—⟨benzene⟩—SO₂CH=CH₂ | Brilliant blue |
| 13 | " | H₂N—⟨benzene⟩(OCH₃)(OCH₃)—SO₂C₂H₄OSO₃H | Brilliant blue |

-continued

| Run No. | Column 1 | Column 2 | Column 3 |
| --- | --- | --- | --- |
| 14 | 1-amino-4-[(2-methoxy-6-aminomethyl-4-sulfo)phenylamino]anthraquinone-2-sulfonic acid | 3-aminophenyl-SO₂C₂H₄OSO₃H ($H_2N$-C₆H₄-$SO_2C_2H_4OSO_3H$) | Brilliant blue |
| 15 | 1-amino-4-[(2-aminomethyl-4-methyl-6-sulfo)phenylamino]anthraquinone-2-sulfonic acid | 3-aminophenyl-$SO_2C_2H_4OCOCH_3$ | Brilliant blue |
| 16 | " | 2-methoxy-5-amino-phenyl-$SO_2C_2H_4OSO_3H$ | Brilliant blue |
| 17 | 1-amino-4-[(2-aminomethyl-4-methoxy-5-sulfo)phenylamino]anthraquinone-2-sulfonic acid | 4-methoxy-3-amino-phenyl-$SO_2C_2H_4OSO_3H$ | Brilliant blue |
| 18 | 1-amino-4-[(2-sulfo-4-aminomethyl-5-sulfo)phenylamino]anthraquinone-2-sulfonic acid | 4-aminophenyl-$SO_2C_2H_4OSO_3H$ | Brilliant blue |
| 19 | " | 3-aminophenyl-$SO_2C_2H_4OSO_3H$ | Brilliant blue |
| 20 | 1-amino-4-[(2-aminomethyl-4-ethyl-5-sulfo)phenylamino]anthraquinone-2-sulfonic acid | 4-aminophenyl-$SO_2CH=CH_2$ | Brilliant blue |

Note: Column 1 entries 14, 15, 17, 18, 20 depict anthraquinone structures with $NH_2$, $SO_3H$ substituents and arylamino groups bearing $CH_2NH_2$, $SO_3H$, $OCH_3$, $CH_3$, or $C_2H_5$ groups as drawn. Entries 16 and 19 repeat the structure above (ditto mark ").

-continued
| Run No. | Column 1 | Column 2 | Column 3 |
|---|---|---|---|
| 21 | " | 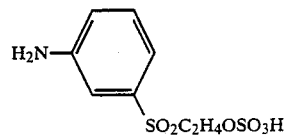 | Brilliant blue |
| 22 | 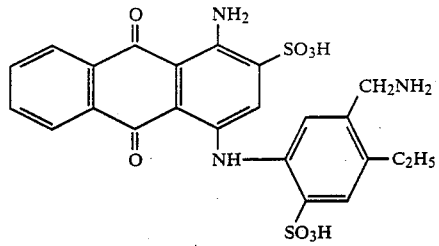 | 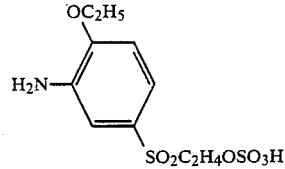 | Brilliant blue |
| 23 | 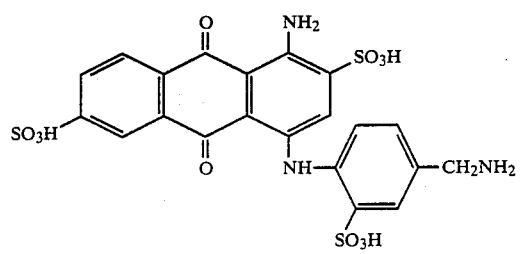 | 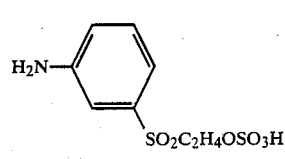 | Brilliant blue |
| 24 | 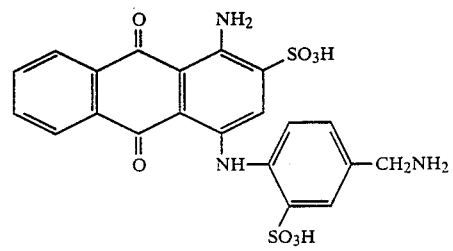 | 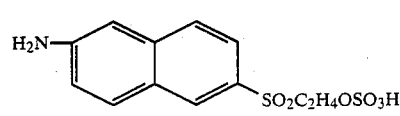 | Brilliant blue |
| 25 | 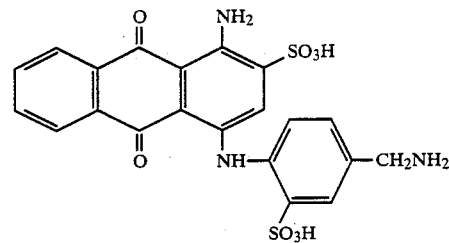 | 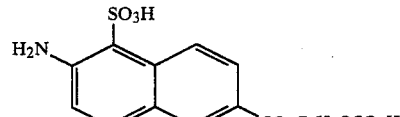 | Brilliant blue |
| 26 | " | 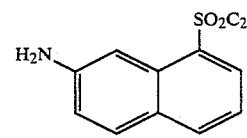 | Brilliant blue |
| 27 | 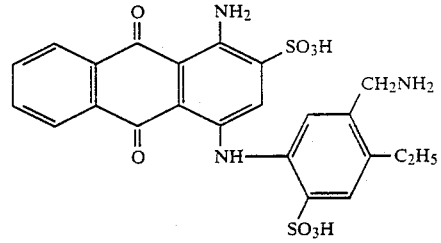 | 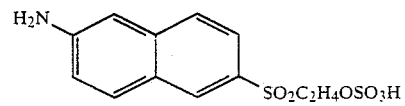 | Brilliant blue |

-continued

| Run No. | Column 1 | Column 2 | Column 3 |
|---|---|---|---|
| 28 | 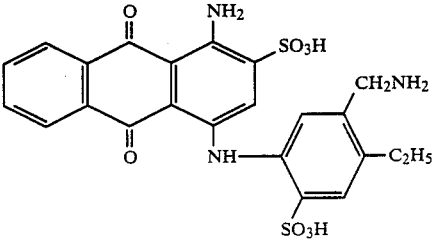 | 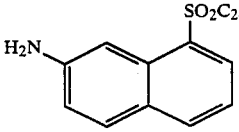 | Brilliant blue |
| 29 | " |  | Brilliant blue |
| 30 | 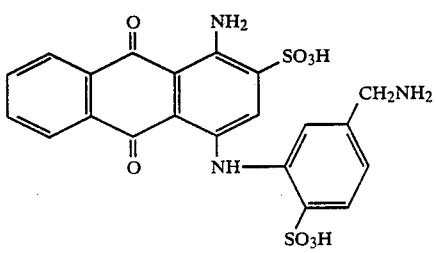 | 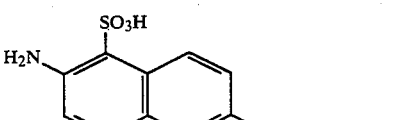 | Brilliant blue |
| 31 | " | 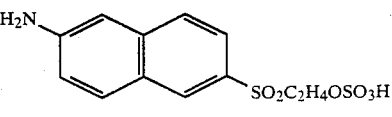 | Brilliant blue |
| 32 | 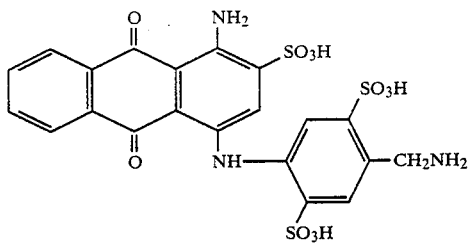 | 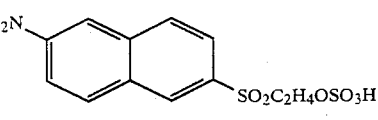 | Brilliant blue |
| 33 | 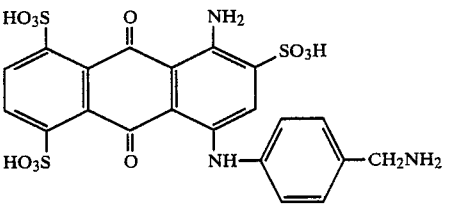 | " | Brilliant blue |
| 34 | " | 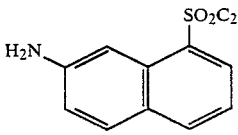 | Brilliant blue |

EXAMPLE 19

1-Amino-4-(3'-2',4',6'-trimethyl-5'-sulfoanilino)anthraquinone-2-sulfonic acid (56.8 parts) was subjected to condensation with cyanuric chloride (93 parts) in water at 20° to 30° C. within a pH of 6 to 7, and the reaction mixture was salted out to obtain an anthraquinone intermediate compound of the following formula in the free acid form.

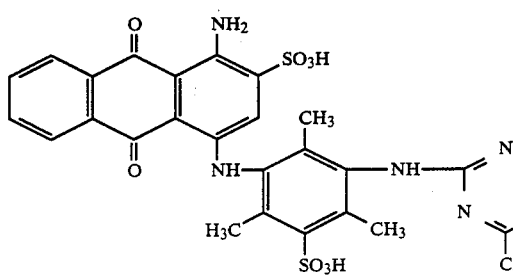 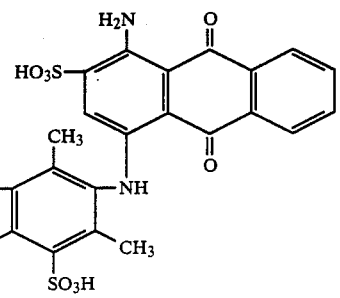

The above intermediate compound was subjected to condensation with 1-aminobenzene-3-β-sulfatoethylsulfone (24.5 parts) at 60° to 70° C. under a weak acid condition, and thereafter, the reaction mixture was salted out to obtain an anthraquinone compound of the following formula in the free acid form.

EXAMPLE 20

Example 19 was repeated, provided that 1-amino-4-(3'-amino-2',4',6'-trimethyl-5'-sulfoanilino)anthraquinone-2-sulfonic acid and 1-aminobenzene-3-β-sulfatoethylsulfone were replaced by the respective compounds shown in Column 1 and Column 2 of the following table, thereby obtaining the corresponding anthraquinone compound of a color on cellulose fibers as shown in Column 3.

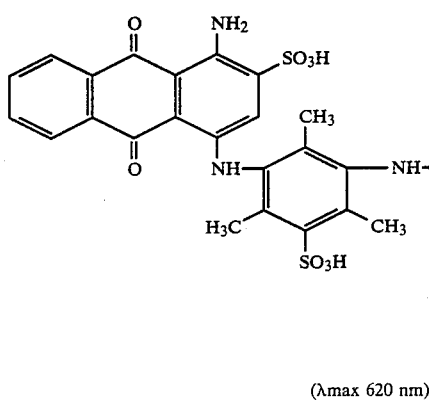

(λmax 620 nm)

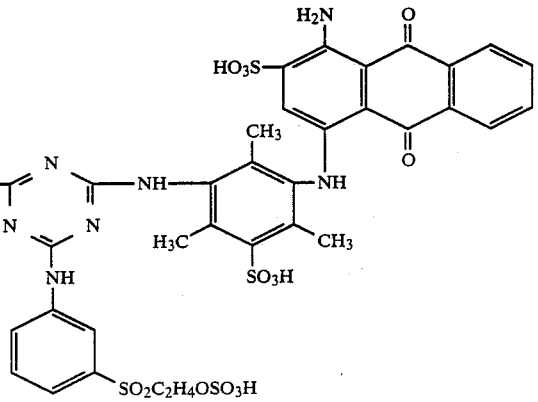

| Run No. | Column 1 | Column 2 | Column 3 |
|---|---|---|---|
| 1 | ![structure] | $H_2N$—⟨⟩—$SO_2C_2H_4OSO_3H$ | Brilliant blue |
| 2 | " | $H_2N$—⟨⟩($OCH_3$)—$SO_2C_2H_4OSO_3H$ | Brilliant blue |
| 3 | " | $C_2H_5$-HN—⟨⟩—$SO_2C_2H_4OSO_3H$ | Brilliant blue |

-continued

| Run No. | Column 1 | Column 2 | Column 3 |
|---|---|---|---|
| 4 | " | 2-chloro-4-(β-sulfatoethylsulfonyl)aniline | Brilliant blue |
| 5 | 1-amino-4-(3-amino-4-sulfophenylamino)anthraquinone-2-sulfonic acid | 3-(β-sulfatoethylsulfonyl)aniline | Brilliant blue |
| 6 | " | 4-methoxy-3-(β-sulfatoethylsulfonyl)aniline | Brilliant blue |
| 7 | " | 4-(β-sulfatoethylsulfonyl)aniline | Brilliant blue |
| 8 | 1-amino-4-(4-amino-2-methyl-5-sulfophenylamino)anthraquinone-2-sulfonic acid | 3-(β-sulfatoethylsulfonyl)aniline | Brilliant blue |
| 9 | 1-amino-4-(4-amino-2-methyl-5-sulfophenylamino)anthraquinone-2-sulfonic acid | 4-(β-sulfatoethylsulfonyl)aniline | Brilliant blue |
| 10 | 1-amino-4-(3-amino-4-sulfophenylamino)anthraquinone-2-sulfonic acid | 3-(β-sulfatoethylsulfonyl)aniline | Brilliant blue |
| 11 | " | 2,5-dimethoxy-4-(β-sulfatoethylsulfonyl)aniline | Brilliant blue |

-continued

| Run No. | Column 1 | Column 2 | Column 3 |
|---|---|---|---|
| 12 | 1-amino-4-(4-aminocyclohexylamino)anthraquinone-2-sulfonic acid | 3-aminophenyl-SO₂C₂H₄OSO₃H (H₂N- at meta) | Brilliant blue |
| 13 | " | 4-amino-2-methylphenyl-SO₂C₂H₄OSO₃H | Brilliant blue |
| 14 | " | 3-(N-ethylamino)phenyl-SO₂C₂H₄OSO₃H | Brilliant blue |
| 15 | " | 4-aminophenyl-SO₂C₂H₄OSO₃H | Brilliant blue |
| 16 | 1-amino-4-(3-aminocyclohexylamino)anthraquinone-2-sulfonic acid | 4-aminophenyl-SO₂C₂H₄OSO₃H | Brilliant blue |
| 17 | " | 4-amino-2-methylphenyl-SO₂C₂H₄OSO₃H | Brilliant blue |
| 18 | 1-amino-4-(4-aminocyclohexylamino)anthraquinone-2,7-disulfonic acid | 3-aminophenyl-SO₂C₂H₄OSO₃H | Brilliant blue |
| 19 | " | 4-amino-3-ethylphenyl-SO₂C₂H₄OSO₃H | Brilliant blue |

| Run No. | Column 1 | Column 2 | Column 3 |
|---|---|---|---|
| 20 | 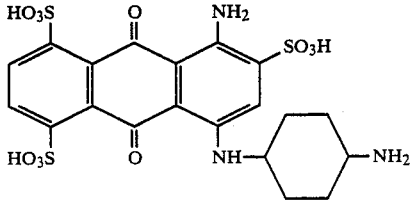 | 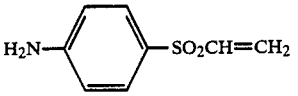 | Brilliant blue |
| 21 | " | 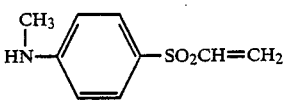 | Brilliant blue |
| 22 | 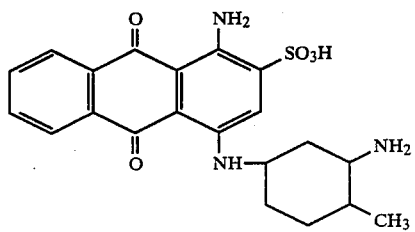 | 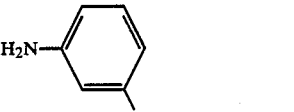 | Brilliant blue |
| 23 | 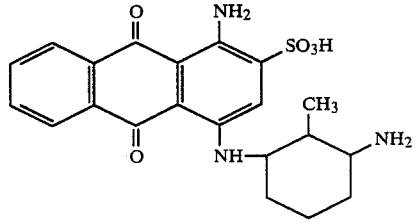 | 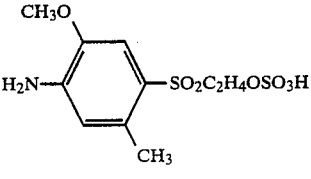 | Brilliant blue |
| 24 | 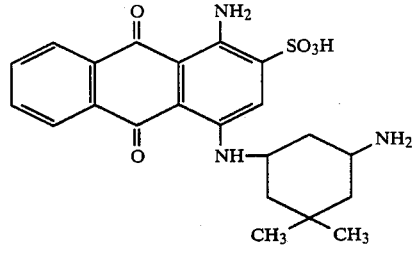 | 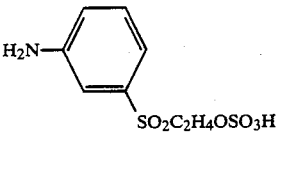 | Brilliant blue |
| 25 | " | 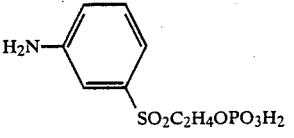 | Brilliant blue |
| 26 | " | 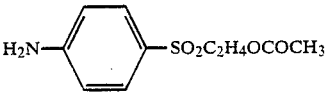 | Brilliant blue |
| 27 | " | 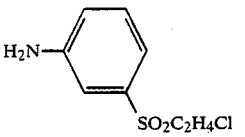 | Brilliant blue |

-continued

| Run No. | Column 1 | Column 2 | Column 3 |
|---|---|---|---|
| 28 | 1-amino-4-(4-aminophenylamino)-anthraquinone-2-sulfonic acid | 3-amino-phenyl-SO$_2$C$_2$H$_4$OSO$_3$H | Brilliant blue |
| 29 | 1-amino-4-(4-aminophenylamino)-anthraquinone-2-sulfonic acid | 2-amino-5-(SO$_2$C$_2$H$_4$OSO$_3$H)-methoxybenzene (CH$_3$O, H$_2$N substituted) | Brilliant blue |
| 30 | " | 4-amino-phenyl-SO$_2$C$_2$H$_4$OSO$_3$H | Brilliant blue |
| 31 | " | 2-amino-phenyl-SO$_2$C$_2$H$_4$OSO$_3$H | Brilliant blue |
| 32 | 1-amino-4-(3-aminophenylamino)-anthraquinone-2-sulfonic acid | 3-(N-ethylamino)-phenyl-SO$_2$C$_2$H$_4$OSO$_3$H | Brilliant blue |
| 33 | 1-amino-4-(4-amino-3-methylphenylamino)-anthraquinone-2-sulfonic acid | 3-amino-phenyl-SO$_2$C$_2$H$_4$OSO$_3$H | Brilliant blue |
| 34 | 1-amino-4-(3-amino-4-methylphenylamino)-anthraquinone-2-sulfonic acid | 4-amino-phenyl-SO$_2$C$_2$H$_4$OSO$_3$H | Brilliant blue |

-continued
| Run No. | Column 1 | Column 2 | Column 3 |
|---|---|---|---|
| 35 | 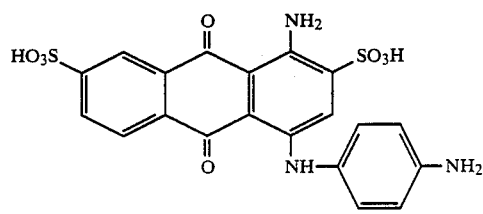 | 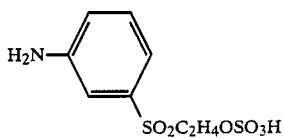 | Brilliant blue |
| 36 | 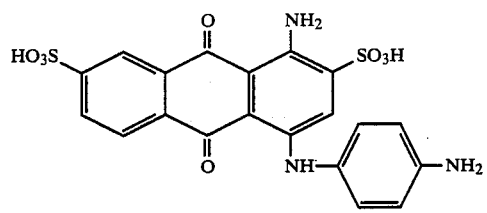 | 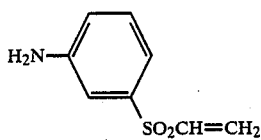 | Brilliant blue |
| 37 | 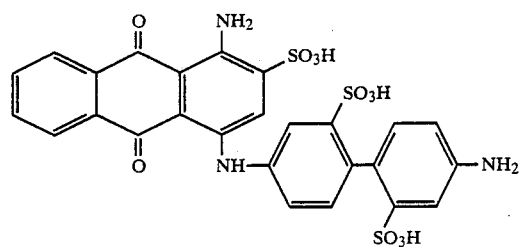 | 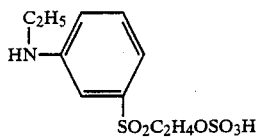 | Brilliant blue |
| 38 | " | 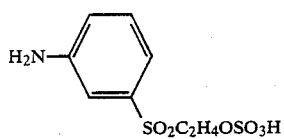 | Brilliant blue |
| 39 | " | 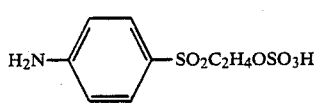 | Brilliant blue |
| 40 | 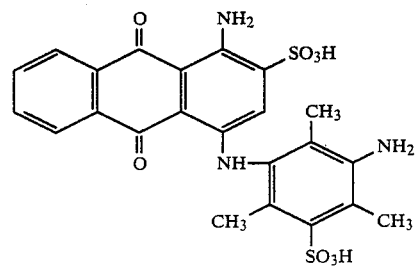 | 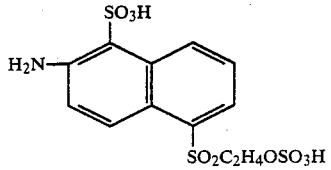 | Brilliant blue |
| 41 | " |  | Brilliant blue |

-continued
| Run No. | Column 1 | Column 2 | Column 3 |
|---|---|---|---|
| 42 | 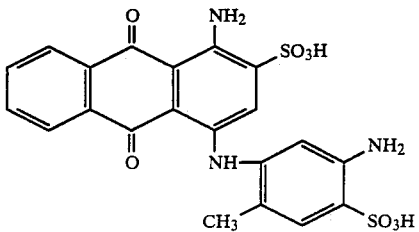 | " | |
| 43 | 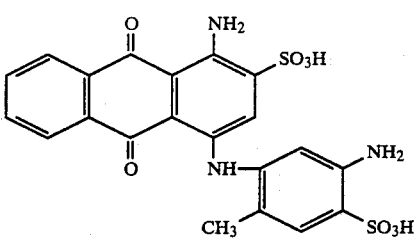 | 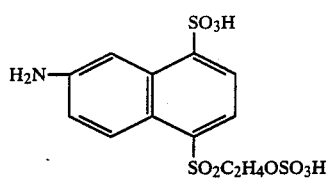 | Brilliant blue |
| 44 | " | 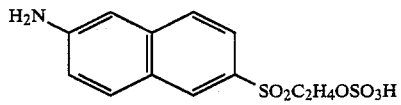 | Brilliant blue |
| 45 | 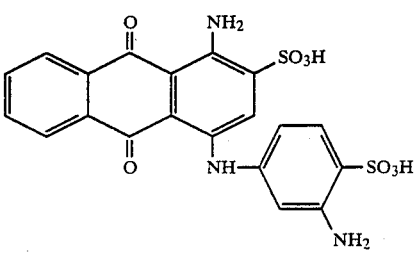 | " | Brilliant blue |
| 46 | 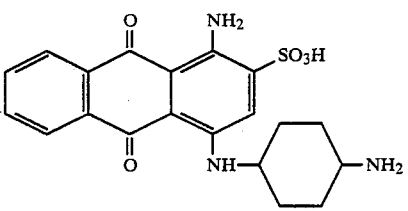 | 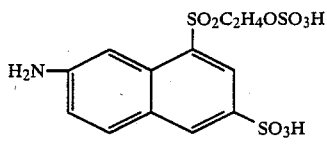 | Brilliant blue |
| 47 | 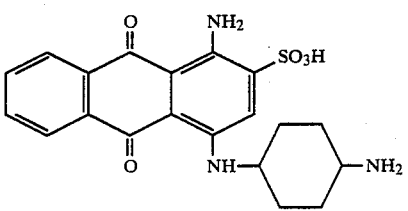 | 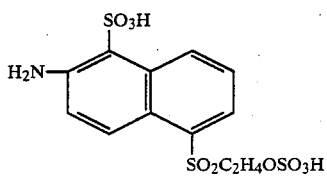 | Brilliant blue |
| 48 | 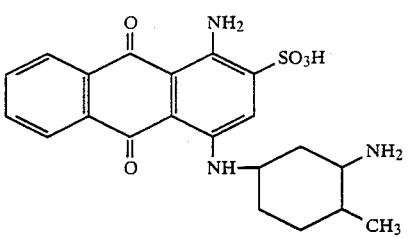 | " | Brilliant blue |

| Run No. | Column 1 | Column 2 | Column 3 |
|---|---|---|---|
| 49 | 1-amino-4-[(3-amino-5,5-dimethylcyclohexyl)amino]anthraquinone | 2-amino-6-(β-sulfatoethylsulfonyl)naphthalene-1-sulfonic acid | Brilliant blue |
| 50 | 1-amino-4-[(4-aminocyclohexyl)amino]-7-sulfoanthraquinone-2-sulfonic acid | " | Brilliant blue |
| 51 | " | 6-amino-2-(β-sulfatoethylsulfonyl)naphthalene | Brilliant blue |
| 52 | 1-amino-4-(4-aminoanilino)anthraquinone-2-sulfonic acid | 7-amino-1-(β-sulfatoethylsulfonyl)naphthalene | Brilliant blue |
| 53 | 1-amino-4-(4-aminoanilino)anthraquinone-2-sulfonic acid | 6-amino-1-(β-sulfatoethylsulfonyl)naphthalene-3-sulfonic acid | Brilliant blue |
| 54 | 1-amino-4-(3-aminoanilino)anthraquinone-2-sulfonic acid | " | Brilliant blue |
| 55 | " | 2-amino-1-sulfo-5-(β-sulfatoethylsulfonyl)naphthalene | Brilliant blue |

DYEING EXAMPLE 15

The anthraquinone compound obtained in Example 19 (each 0.1, 0.3 and 0.6 part) was dissolved in water (200 parts), and then sodium sulfate (20 parts) and cotton (10 parts) were added thereto. The bath was heated to 60° C., and 30 minutes thereafter, sodium carbonate (3 parts) was added thereto. Dyeing was continued for 1 hour at that temperature. Thereafter, the cotton taken out was washed with water and soaped to obtain each dyed product of a brilliant blue color superior in fastness properties, particularly light fastness and perspiration-light fastness with excellent build-up property.

The compound was also found to have superior solubility, level-dyeing property and reproducibility of the dyeing.

DYEING EXAMPLE 16

The anthraquinone compound obtained in Run No. 5 of Example 20 (0.3 part) was dissolved in water (200 parts), and sodium sulfate (20 parts) and cotton (10 parts) were added thereto. The bath was heated to 60° C., and 20 minutes thereafter, trisodium phosphate (3 parts) was added thereto. Dyeing was continued for 1 hour at that temperature. Thereafter, the cotton taken out was washed with water and soaped to obtain a dyed product of a brilliant blue color superior in fastness properties.

DYEING EXAMPLE 17

| Composition of printing paste | Parts |
|---|---|
| Anthraquinone compound obtained in Example 17 | 5 |
| Urea | 5 |
| Sodium alginate (5%), thickner | 50 |
| Hot water | 25 |
| Sodium hydrogencarbonate | 2 |
| Balance (water) | 13 |

Mercerized cotton broad cloth was printed with the printing paste of the above composition, pre-dried, steamed at 100° C. for 5 minutes, washed with hot water, soaped, again washed with hot water and dried, to obtain a printed product of a brilliant blue color superior in fastness properties.

What is claimed is:

1. An anthraquinone compound of the following formula in the free acid form,

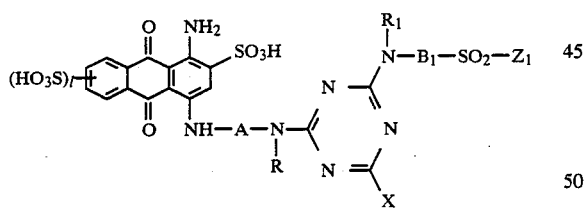

wherein R and $R_1$ independently of one another are each hydrogen or alkyl, A is divalent group of the following formula (a), (b), (c), (d), (e), or (f), the formula (a) being

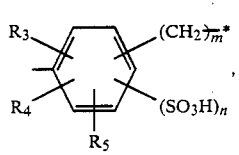

in which $R_3$, $R_4$ and $R_5$ independently of one another are each hydrogen, methyl, ethyl, methoxy or ethoxy, m is 0 or 1, n is 0, 1 or 2, and the asterisked linkage bonds to

the formula (b) being

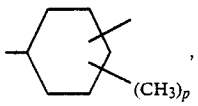

in which p is 0, 1, 2 or 3, the formula (c) having $-CH_2)_q$, in which q is an interger of from 2 through 6, the formula (d) being

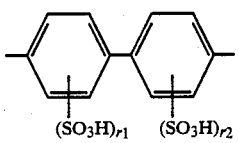

in which $r_1$ and $r_2$ are each 0, 1 or 2, and $r_1+r_2=1$ or 2, the formula (e) being

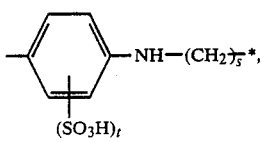

in which s is an integer of from 2 through 6, t is 0, 1 or 2, and * is as defined above, and the formula (f) being

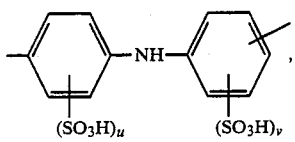

in which u and v independently of one another are each 0, 1 or 2, $B_1$ is phenylene unsubstituted or substituted once or twice by methyl, ethyl, methoxy, ethoxy, chloro, bromo or nitro, or naphthylene unsubstituted or substituted by sulfo, $Z_1$ is vinyl or $-CH_2CH_2L$ in which L is a group capable of being split by the action of an alkali, l is 0, 1 or 2, and X is a group of the following formula (g), (h) or (i), the formula (g) being

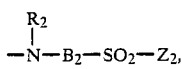

in which $R_2$ is hydrogen or alkyl, $B_2$ is phenylene unsubstituted or substituted once or twice by methyl, ethyl, methoxy, ethoxy, chloro, bromo, nitro, carboxy or sulfo, or naphthylene unsubstituted or substituted by sulfo, and $Z_2$ is vinyl or $-CH_2CH_2L$ in which L is as defined above, the formula

in which $R_6$ and $R_7$ independently of one another are each hydrogen, alkyl, phenyl, naphthyl or benzyl, and the formula (i) being

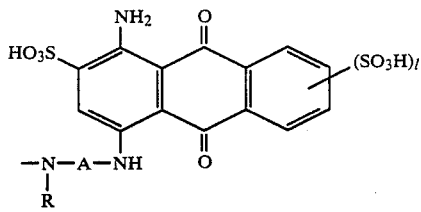

in which R, A and l are as defined above.

2. A compound according to claim 1, wherein the alkyl represented by R and $R_1$ is $C_1$-$C_4$ alkyl unsubstituted or substituted by hydroxy, cyano, $C_1$-$C_4$ alkoxy, halogeno, carbamoyl, carboxy, $C_1$-$C_4$ alkoxycarbonyl, $C_1$-$C_4$ alkylcarbonoxy, sulfo or sulfamoyl.

3. A compound according to claim 1, wherein R is hydrogen or methyl.

4. A compound according to claim 1, wherein $R_1$ is hydrogen, methyl or ethyl.

5. A compound according to claim 1, wherein the divalent group represented by A is one having the formula (a) wherein $R_3$, $R_4$ and $R_5$ independently of one another are each hydrogen or methyl, m is 0 or 1 and n is 1, or the formula (b) wherein p is 0, 1 or 2, or the formula (c) wherein q is 2, 3 or 4, or the formula (d) wherein r is 2, or the formula (e) wherein s is 2, 3 or 4, and t is 0 or 1, or the formula (f) wherein u and v independently of one another are each 0 or 1.

6. A compound according to claim 1, wherein $B_1$ is phenylene unsubstituted or substituted by methyl or ethoxy, or naphthylene unsubstituted or substituted by sulfo.

7. A compound according to claim 1, wherein the group represented by X is one having the formula (g) wherein $R_2$ is hydrogen, methyl or ethyl, $B_2$ is phenylene unsubstituted or substituted by methyl, methoxy or sulfo, or naphthylene unsubstituted or substituted by sulfo, and $Z_2$ is β-sulfatoethyl.

8. A compound according to claim 1, wherein the group represented by X is one having the formula (h) wherein $R_6$ and $R_7$ independently of one another are each hydrogen, $C_1$-$C_4$ alkyl unsubstituted or substituted once or twice by $C_1$-$C_4$ alkoxy, sulfo, carboxy, hydroxy, chloro, phenyl or sulfato, phenyl unsubstituted or substituted once or twice by $C_1$-$C_4$ alkyl, $C_1$-$C_4$ alkoxy, sulfo, carboxy or chloro, naphthyl unsubstituted or substituted once, twice or three times by hydroxy, carboxy, sulfo, $C_1$-$C_4$ alkyl, $C_1$-$C_4$ alkoxy or chloro, or benzyl unsubstituted or substituted once or twice by $C_1$-$C_4$ alkyl, $C_1$-$C_4$ alkoxy, sulfo or chloro.

9. A compound according to claim 1, wherein the group represented by X is one having the formula (i) wherein A and l are as defined in claim 1, and R is hydrogen or methyl.

10. A compound according to claim 7, wherein the group represented by X is one having the formula (h) wherein any one of $R_6$ and $R_7$ is the unsubstituted or substituted phenyl or naphthyl, and the other is hydrogen or the alkyl.

11. A compound according to claim 1, which is represented by the following formula in the free acid form,

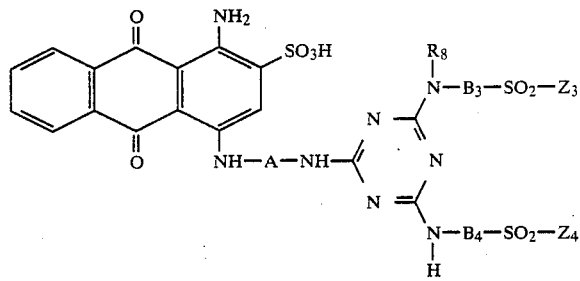

wherein A is as defined in claim 1, $R_8$ is hydrogen, methyl or ethyl, $B_3$ and $B_4$ independently of one another are each phenylene unsubstituted or substituted by methyl or methoxy, and $Z_3$ and $Z_4$ independently of one another are each β-sulfatoethyl or vinyl.

12. A compound according to claim 1, which is represented by the following formula in the free acid form,

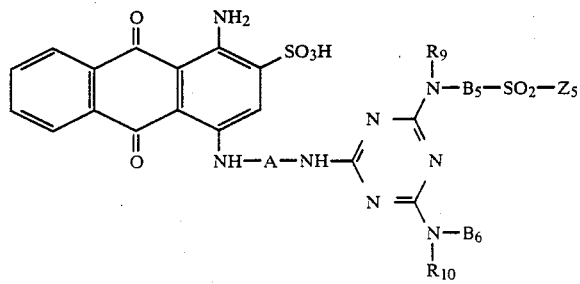

wherein A is as defined in claim 1, $R_9$ and $R_{10}$ independently of one another are each hydrogen, methyl or ethyl, $B_5$ is phenylene unsubstituted or substituted by methyl or methoxy, or naphthylene unsubstituted or substituted by sulfo, $B_6$ is phenyl or naphthyl unsubstituted or substituted once or twoce by methyl, ethyl, methoxy, ethoxy, sulfo, carboxy or chloro, and $Z_5$ is β-sulfatoethyl or vinyl.

13. A compound according to claim 1, which is represented by the following formula in the free acid form, methyl or ethyl, $B_7$ is phenylene unsubstituted or substituted by methyl or methoxy, or naphthylene unsubstituted or substituted by sulfo, and $Z_6$ is β-sulfatoethyl or vinyl.

14. A compound according to claim 1, wherein $Z_1$ is β-sulfatoethyl or vinyl.

* * * * *

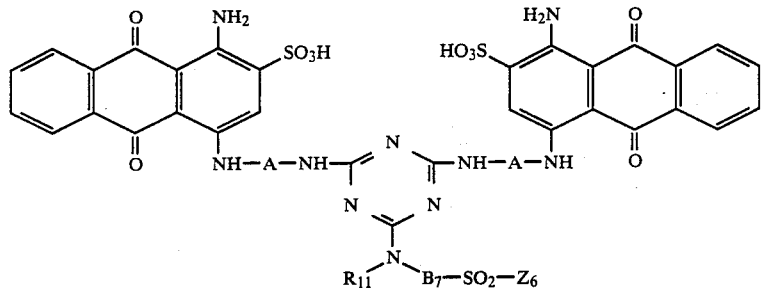

wherein A is as defined in claim 1, $R_{11}$ is hydrogen,